US009193352B2

United States Patent
Morimoto

(10) Patent No.: US 9,193,352 B2
(45) Date of Patent: *Nov. 24, 2015

(54) DRIVE FORCE OUTPUT APPARATUS FOR VEHICLE

(71) Applicant: DENSO CORPORATION, Kariya, Aichi-pref. (JP)

(72) Inventor: Youhei Morimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 34 days.

This patent is subject to a terminal disclaimer.

(21) Appl. No.: 13/739,737

(22) Filed: Jan. 11, 2013

(65) Prior Publication Data

US 2013/0179020 A1 Jul. 11, 2013

(30) Foreign Application Priority Data

Jan. 11, 2012 (JP) .................................... 2012-3222

(51) Int. Cl.
*B60W 20/00* (2006.01)
*B60W 10/06* (2006.01)
*B60W 10/08* (2006.01)

(52) U.S. Cl.
CPC ............ *B60W 20/106* (2013.01); *B60W 10/06* (2013.01); *B60W 10/08* (2013.01); *B60W 20/10* (2013.01); *B60W 2600/00* (2013.01); *B60W 2710/0666* (2013.01); *B60W 2710/083* (2013.01); *B60W 2710/248* (2013.01); *Y02T 10/6286* (2013.01); *Y02T 10/7258* (2013.01); *Y10S 903/93* (2013.01)

(58) Field of Classification Search
USPC ........... 701/22, 54; 180/65.21, 65.22, 65.245; 475/5
See application file for complete search history.

(56) References Cited

U.S. PATENT DOCUMENTS

| 4,837,690 | A  | * | 6/1989  | Morishita et al. ............... 701/43 |
| 7,121,164 | B2 | * | 10/2006 | Hanyu et al. .................... 74/661 |
| 7,654,928 | B2 | * | 2/2010  | Miller et al. .................. 475/189 |
| 7,992,661 | B2 | * | 8/2011  | Nomura et al. ............ 180/65.21 |
| 2003/0078134 | A1 | * | 4/2003 | Kojima et al. .................... 477/3 |
| 2005/0102082 | A1 |   | 5/2005 | Joe et al. |
| 2010/0009805 | A1 | * | 1/2010 | Bachmann ........................ 477/5 |
| 2012/0165149 | A1 |   | 6/2012 | Morimoto et al. |

FOREIGN PATENT DOCUMENTS

JP          7-135701         5/1995

OTHER PUBLICATIONS

Office Action (2 pages) dated Jan. 27, 2014, issued in corresponding Japanese Application No. 2012-003222 and English translation (4 pages).
Morimoto, U.S. Appl. No. 13/739,660, filed Jan. 11, 2013.

* cited by examiner

*Primary Examiner* — James Trammell
*Assistant Examiner* — Majdi Alsomiri
(74) *Attorney, Agent, or Firm* — Nixon & Vanderhye P.C.

(57) ABSTRACT

An engine shaft of an engine, rotatable shafts of motor generators and a drive force output shaft are interconnected with each other through a drive force transmission arrangement. An ECU computes a torque command value of each of the motor generators through use of an equation of torque equilibrium, which corresponds to the drive force transmission arrangement, based on an engine shaft demand motor generator torque and an output shaft demand motor generator torque.

16 Claims, 15 Drawing Sheets

DRIVE FORCE OUTPUT APPARATUS FOR VEHICLE

CROSS REFERENCE TO RELATED APPLICATION

This application is based on and incorporates herein by reference Japanese Patent Application No. 2012-3222 filed on Jan. 11, 2012.

TECHNICAL FIELD

The present disclosure relates to a drive force output apparatus of a vehicle.

BACKGROUND

Lately, a hybrid vehicle, which has an internal combustion engine and a motor generator(s) as drive sources of the vehicle, attracts attention because of increased public demands of low fuel consumption and low exhaust emissions. For example, JP H07-135701A teaches a hybrid vehicle, which has an internal combustion engine and first and second motor generators. A drive force of the engine is divided to two systems through a planetary gear mechanism. An output of one of the systems is used to drive a drive shaft to drive wheels of the vehicle. Furthermore, an output of the other one of the systems is used to drive the first motor generator to generate an electric power. The electric power generated by the first motor generator and/or electric power supplied from a battery is used to drive the second motor generator to enable driving of the drive shaft with the power supplied from the second motor generator.

In the hybrid vehicle, which has the engine and the two motor generators, it is demanded to achieve three objectives, i.e., (1) controlling of the rotational speed of the engine, (2) controlling of the output torque and (3) limiting of input and output of the electric power at the battery. However, in the system, in which the engine shaft (an output shaft of the engine) and the drive force output shaft are coupled with each other through a drive force transmission arrangement, which has, for example, the planetary gear mechanism(s), when the two motor generators are individually controlled without integrally controlling the two motor generators, the above-specified three objectives may not be achieved, or the control operation of the motor generators become complicated. For instance, in a system, which has two planetary gear mechanisms, the above-specified three objectives may not be achieved. Also, in a system, which has a single planetary gear mechanism, the control operation of the motor generators may become extremely complicated.

SUMMARY

The present disclosure is made in view of the above disadvantages. According to the present disclosure, there is provided a drive force output apparatus for a vehicle, including an internal combustion engine, a plurality of motor generators, a drive force transmission arrangement, a battery, an engine shaft demand motor generator torque computing section, an output shaft demand motor generator torque computing section and a motor generator torque command value computing section. The drive force transmission arrangement includes at least one drive force dividing mechanism. An engine shaft of the internal combustion engine, rotatable shafts of the plurality of motor generators and a drive force output shaft are interconnected with each other through the drive force transmission arrangement in a manner that enables transmission of a drive force through the drive force transmission arrangement, and the drive force output shaft is connected to a plurality of wheels of the vehicle to transmit a drive force. The battery is connected to the plurality of motor generators to output and receive an electric power relative to the plurality of motor generators. The engine shaft demand motor generator torque computing section computes an engine shaft demand motor generator torque, which is a torque that is provided from the plurality of motor generators and is required by the engine shaft of the internal combustion engine to control a rotational speed of the internal combustion engine. The output shaft demand motor generator torque computing section computes an output shaft demand motor generator torque, which is a torque that is provided from the plurality of motor generators and is required by the drive force output shaft to ensure supply of a required drive force of the vehicle and to limit input and output of the battery. The motor generator torque command value computing section computes a torque command value of each of the plurality of motor generators through use of an equation of torque equilibrium, which corresponds to the drive force transmission arrangement, based on the engine shaft demand motor generator torque and the output shaft demand motor generator torque.

BRIEF DESCRIPTION OF THE DRAWINGS

The drawings described herein are for illustration purposes only and are not intended to limit the scope of the present disclosure in any way.

DETAILED DESCRIPTION

Figure 1:
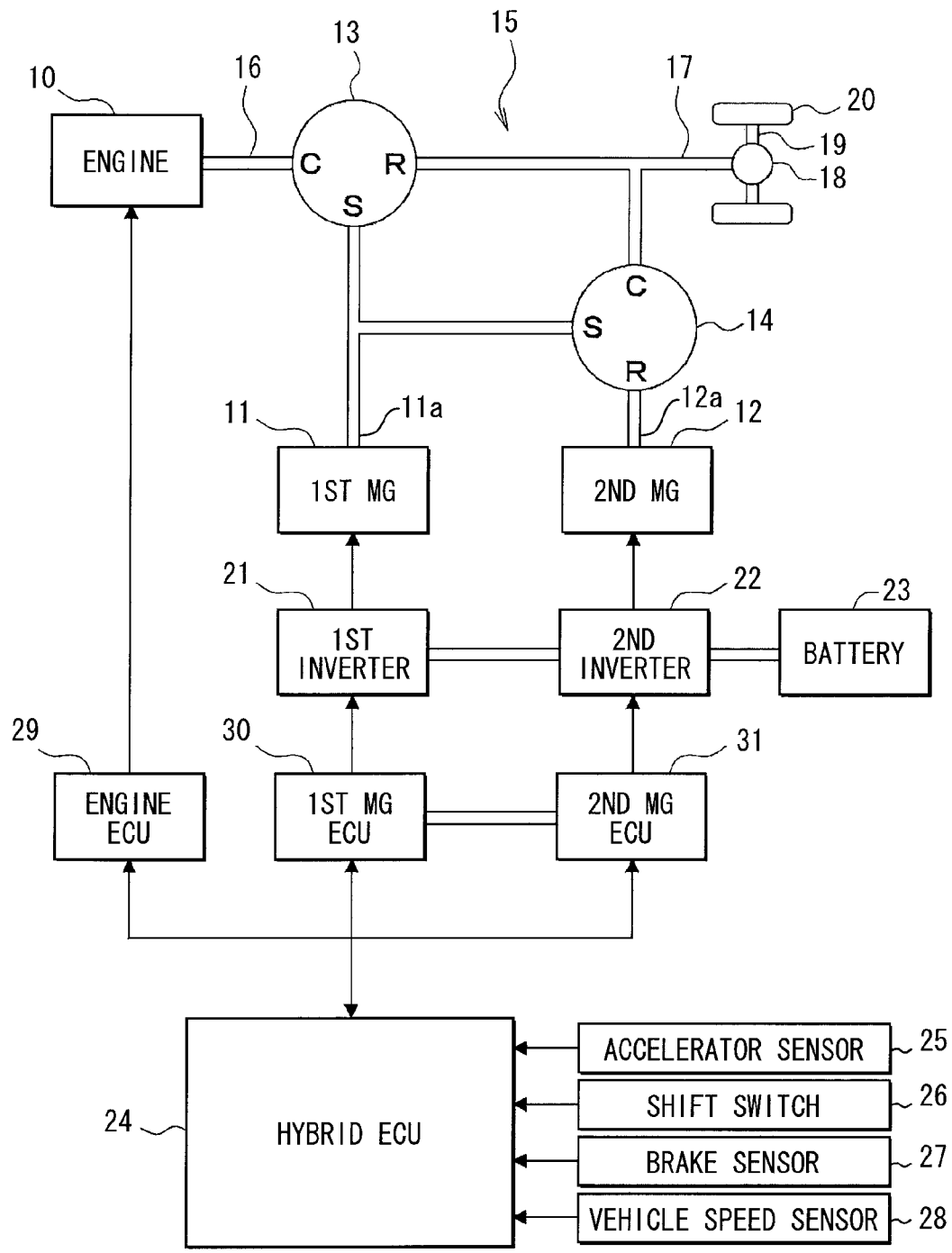
FIG. 1 is a schematic diagram showing a structure of a drive system of a vehicle according to a first embodiment of the present disclosure.

Various embodiments of the present disclosure will be described with reference to the accompanying drawings.

First Embodiment

A first embodiment of the present disclosure will be described with reference to FIGS. 1 to 9.

First, an entire structure of a drive system (drive force output apparatus) of a vehicle (more specifically, an automobile) of the present embodiment will be described with reference to FIG. 1.

An internal combustion engine 10, a first motor generator (hereinafter referred to as a first MG) 11, a second motor generator (hereinafter referred to as a second MG) 12 and a drive force transmission arrangement 15 are installed in the vehicle. In the following description, the term of motor generator may be abbreviated as "MG" for the sake of simplicity. The drive force transmission arrangement 15 includes a first planetary gear mechanism (a drive-force dividing mechanism) 13 and a second planetary gear mechanism (a drive-force dividing mechanism) 14. The first MG 11 is mainly used as an electric generator (power generator) but is also used as an electric motor. In contrast, the second MG 12 is mainly used as an electric motor but is also used as an electric generator (power generator).

Each of the first and second planetary gear mechanisms 13, 14 includes a sun gear S, a plurality of planetary gears, a planetary carrier C and a ring gear R. In each planetary gear mechanism 13, 14, the sun gear S rotates about a central axis thereof, and each of the planetary gears rotates about a central axis thereof and revolves around the sun gear S. Furthermore, the planetary carrier C rotates integrally with the planetary gears, and the ring gear R is placed on a radially outer side of the planetary gears and rotates around the planetary gears.

In the drive force transmission arrangement 15, an engine shaft 16 (an output shaft) of the engine 10 and the planetary carrier C of the first planetary gear mechanism 13 are interconnected with each other in a manner that enables conduction of the drive force therebetween. The sun gear S of the first planetary gear mechanism 13, the sun gear S of the second planetary gear mechanism 14 and a rotatable shaft 11a of the first MG 11 are interconnected with each other in a manner that enables conduction of the drive force therebetween. Furthermore, the ring gear R of the first planetary gear mechanism 13, the planetary carrier C of the second planetary gear mechanism 14 and a drive force output shaft 17 are interconnected with each other in a manner that enables conduction of the drive force therebetween, and the ring gear R of the second planetary gear mechanism 14 and a rotatable shaft 12a of the second MG 12 are interconnected with each other in a manner that enables conduction of the drive force therebetween. The drive force of the drive force output shaft 17 is conducted to wheels 20 of the vehicle through a differential gear mechanism 18 and an axle 19.

Furthermore, a first inverter 21, which drives the first MG 11, and a second inverter 22, which drives the second MG 12, are provided. The first MG 11 and the second MG 12 are connected to a battery 23 through the inverters 21, 22, respectively, to output and receive the electric power relative to the battery 23, i.e., to output the electric power to and to receive the electric power from the battery 23. Furthermore, the first MG 11 and the second MG 12 are interconnected with each other to output and receive the electric power therebetween through the inverters 21, 22.

A hybrid ECU 24 is a computer, which controls the entire vehicle. The hybrid ECU 24 receives output signals from various sensors and switches to sense the driving state of the vehicle. These sensors and switches include, for example, an accelerator sensor 25, a shift switch 26, a brake sensor 27 and a vehicle speed sensor 28. The accelerator sensor 25 senses a degree of depression of an accelerator pedal (also referred to as the amount of depression of the accelerator pedal or an accelerator opening degree). The shift switch 26 senses a shift position (an operational position of a shift lever). The brake sensor 27 senses a degree of depression of a brake pedal (also referred to as the amount of depression of the brake pedal or a brake opening degree). The vehicle speed sensor 28 senses a traveling speed of the vehicle. The hybrid ECU 24 transmits and receives control signals and data signals relative to an engine ECU 29, a first MG ECU 30 and a second MG ECU 31. The engine ECU 29 controls operation of the engine 10. The first MG ECU 30 controls the first inverter 21 to control the first MG 11. The second MG ECU 31 controls the second inverter 22 to control the second MG 12. The engine ECU 29, the first MG ECU 30 and the second MG ECU 31 control the engine 10, the first MG 11 and the second MG 12, respectively, based on the driving state (driving condition) of the vehicle.

For example, at the time of driving the vehicle in the normal drive mode, the drive force of the engine 10 is divided to two systems, i.e., the rotatable shaft of the ring gear R and the rotatable shaft of the sun gear S of the first planetary gear mechanism 13. Also, at this time, the drive force of the rotatable shaft of the sun gear S of the first planetary gear mechanism 13 is divided and conducted to the rotatable shaft of the sun gear S of the second planetary gear mechanism 14 and the first MG 11. In this way, the first MG 11 is driven to generate the electric power. Also, at this time, the electric power, which is generated by the first MG 11, is used to drive the second MG 12, so that the drive force of the second MG 12 is conducted to the rotatable shaft of the ring gear R of the second planetary gear mechanism 14. The drive force of the rotatable shaft of the ring gear R of the first planetary gear mechanism 13 and the drive force of the rotatable shaft of the planetary carrier C of the second planetary gear mechanism 14 are both conducted to the drive force output shaft 17 to drive the wheels 20 through the drive force output shaft 17 and thereby to drive the vehicle. Furthermore, at the time of rapidly accelerating the vehicle, the electric power is supplied from the battery 23 to the second MG 12 in addition to the electric power generated at the first MG 11, so that the electric power supplied to the second MG 12 for driving the same is increased.

At the time of starting the traveling of the vehicle or at the time of a low load driving state of the vehicle (an operational range of the engine 10, in which a fuel efficiency is low), the engine 10 is maintained in an engine stop state, and the first MG 11 and/or the second MG 12 are driven with the electric power supplied from the battery 23 to drive the wheels 20 with the drive forces of the first MG 11 and/or the second MG 12, so that the vehicle is driven in the EV drive mode (the drive mode for driving the vehicle only with the electric motor power provided by the first MG 11 and the second MG 12 powered by the battery output of the battery 23). At the time of decelerating the vehicle, the second MG 12 is driven with the drive force of the wheels 20, and thereby the second MG 12 is operated as the electric generator. Thus, the kinetic energy of the vehicle is converted into the electric power through the second MG 12, and the thus generated electric power is stored in the battery 23. In this way, the kinetic energy of the vehicle is recovered.

In the hybrid vehicle, which has the engine 10 and the two MGs 11, 12, it is demanded to achieve three objectives, i.e., (1) controlling of the rotational speed of the engine, (2) controlling of the output torque (i.e., the torque of the drive force output shaft 17) and (3) limiting of the input and output of the electric power at the battery 23, by controlling the two MGs 11, 12.

Therefore, according to the first embodiment, the respective routines of FIGS. 4 to 9, which will be described later, are executed by the hybrid ECU 24. Specifically, the hybrid ECU 24 computes a torque (hereinafter referred to as an engine shaft demand MG torque), which is required by the engine shaft 16 and is provided from the first and second MGs 11, 12 to control the engine rotational speed, and a torque (hereinafter referred to as an output shaft demand MG torque), which is required by the drive force output shaft 17 and is provided from the first and second MGs 11, 12 to provide the required drive force of the vehicle and to limit the input and output of the electric power at the battery 23. Then, the hybrid ECU 24 computes a torque command value of the first MG 11 and a torque command value of the second MG 12 by using an equation of torque equilibrium (an equation (1) described later), which corresponds to the drive force transmission arrangement 15, based on the engine shaft demand MG torque and the output shaft demand MG torque discussed above. In this way, the torque command value of the first MG 11 and the torque command value of the second MG 12, which are required to achieve the three objectives, i.e., the controlling of the rotational speed of the engine, the controlling of the output torque and the limiting of the input and output of the electric power at the battery, can be relatively easily set, and thereby the torque of the first MG 11 and the torque of the second MG 12 can be cooperatively controlled.

Figure 2:
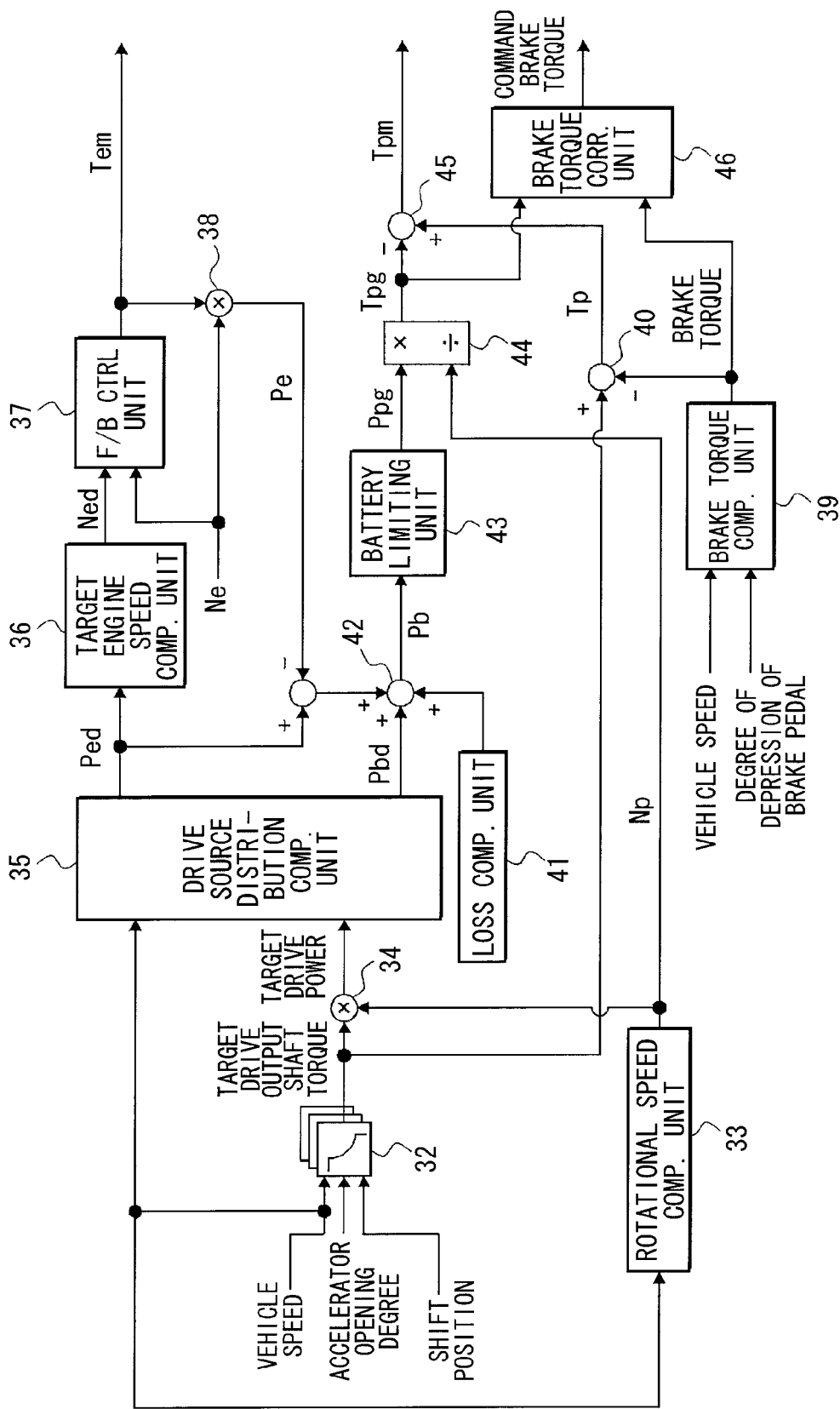
FIG. 2 is a block diagram (part 1) showing a function of computing a torque command value of each motor generator according to the first embodiment.
Figure 3:
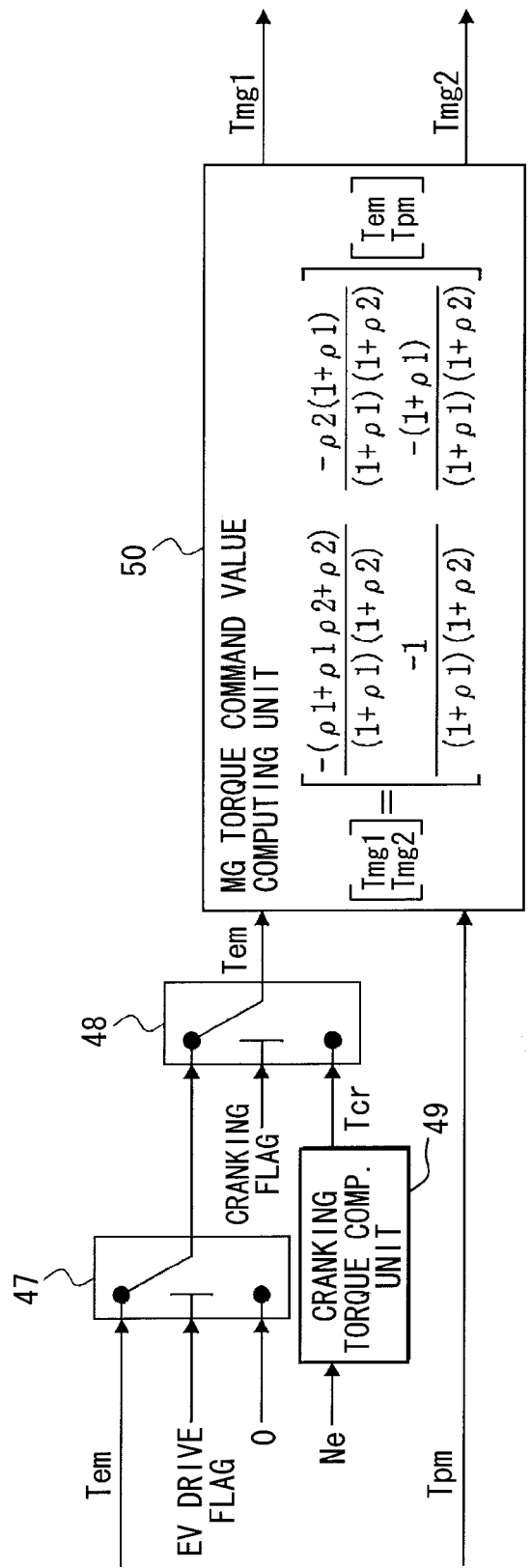
FIG. 3 is a block diagram (part 2) showing the function of computing the torque command value of each motor generator according to the first embodiment.

Now, with reference to a block diagram shown in FIGS. 2 and 3, a method of computing the torque command value of the first MG 11 and the torque command value of the second MG 12, will be schematically described.

As shown in FIG. 2, a target drive output shaft torque computing unit 32 computes a target drive output shaft torque based on, for example, the vehicle speed (the vehicle speed sensed with the vehicle speed sensor 28), the degree of depression of the accelerator pedal (more specifically, information, i.e., a corresponding value that directly or indirectly indicates the degree of depression of the accelerator pedal sensed with the accelerator sensor 25), the shift position (the shift position sensed with the shift switch 26) and the degree of depression of the brake pedal (more specifically, information, i.e., a corresponding value that directly or indirectly indicates the degree of depression of the brake pedal sensed with the brake sensor 27), through use of, for example, a map. The target drive output shaft torque is a target drive torque of the drive force output shaft 17. The target drive output shaft torque will be a positive value when the torque is exerted in a driving direction of the drive force output shaft 17. In contrast, the target drive output shaft torque will be a negative value when the torque is exerted in a braking direction of the drive force output shaft 17.

Furthermore, a rotational speed computing unit 33 computes a drive force output shaft rotational speed Np (a rotational speed of the drive force output shaft 17) based on the vehicle speed. Then, a target drive power computing unit 34 obtains a target drive power by multiplying the target drive output shaft torque by the drive force output shaft rotational speed Np.

Furthermore, a drive source distribution computing unit 35 computes a target engine output Ped of the engine 10 and a target battery output Pbd of the battery 23 as follows. First of all, at the drive source distribution computing unit 35, a total vehicle losing power is computed based on, for example, the target drive output shaft torque with reference to a map. Thereafter, a total demand power Ptotal is computed by adding the total vehicle losing power to the target drive power. Furthermore, the target battery output Pbd is computed according to the state of the vehicle. Then, the target engine output Ped is computed by subtracting the target battery output Pbd from the total demand power Ptotal.

Furthermore, a target engine rotational speed computing unit (also simply referred to as a target engine speed computing unit) 36 computes a target engine rotational speed Ned of the engine 10 (more specifically the engine shaft 16) based on the target engine output Ped through use of, for example, a map. Thereafter, a feedback (F/B) control unit 37 computes an engine shaft demand MG torque Tem of the engine 10 in a manner that reduces (or minimizes) a difference between the target engine rotational speed Ned and an actual engine rotational speed Ne of the engine 10 (more specifically the engine shaft 16). In this way, the engine shaft demand MG torque Tem, which is required to control the actual engine rotational speed Ne to the target engine rotational speed Ned, can be accurately computed. Thereafter, an actual engine output estimating unit 38 computes an actual engine output Pe (estimate value) of the engine 10 after execution of the F/B control operation by multiplying the engine shaft demand MG torque Tem by the actual engine rotational speed Ne.

Furthermore, a mechanical brake torque computing unit 39 computes a mechanical brake torque (or simply referred to as a brake torque) based on, for example, the vehicle speed and/or the degree of depression of the brake pedal (more specifically, the information that directly or indirectly indicates the degree of depression of the brake pedal) through use of, for example, a map. Thereafter, an output shaft demand torque computing unit 40 computes an output shaft demand torque Tp by subtracting the mechanical brake torque from the target drive output shaft torque. In this way, the output shaft demand torque Tp, which is a torque required by the drive force output shaft 17 to ensure supply of a required drive force of the vehicle, can be accurately computed. Furthermore, an electric system loss computing unit 41 computes an electric system loss of, for example, the first and second MGs 11, 12, the first and second inverters 21, 22 and the battery 23 in conformity with the state of the vehicle.

Furthermore, a battery output estimate value computing unit 42 computes a battery output estimate value Pb by adding the electric system loss and a difference (i.e., Ped−Pe) between the target engine output Ped and the actual engine output Pe to the target battery output Pbd. The battery output estimate value Pb is an output estimate value of the battery 23.

Also, a battery limiting unit 43 computes an output shaft power limit amount Ppg as follows. First of all, a battery output limit value, which is an output limit value of the battery 23, is computed based on a state of the battery 23 (e.g., a charge state and/or a temperature of the battery 23) through use of, for example, a map. In this case, a discharging-side output limit value (a positive value) and a charging-side output limit value (a negative value) are computed as the battery output limit values. Then, an excess amount of the battery output estimative value Pb relative to the battery output limit value (the discharging-side output limit value or the charging-side output limit value) is computed as the output shaft power limit amount Ppg.

Thereafter, an output shaft torque limit amount computing unit 44 computes an output shaft torque limit amount Tpg by dividing the output shaft power limit amount Ppg by the drive force output shaft rotational speed Np. In this way, the output shaft torque limit amount Tpg, which is a torque limit amount of the drive force output shaft 17 and is required to limit the input and output of the electric power to the battery 23, can be accurately computed. Then, an output shaft demand MG torque computing unit 45 computes an output shaft demand MG torque Tpm by subtracting the output shaft torque limit amount Tpg from the output shaft demand torque Tp. In this way, the output shaft demand MG torque Tpm, which is required to limit the input and output of the electric power to the battery 23, is accurately computed while providing the required drive force of the vehicle.

Furthermore, in a case where the output shaft torque limit amount Tpg is smaller than zero (i.e., Tpg<0), a mechanical brake torque correcting unit 46 computes a command mechanical brake torque by adding the output shaft torque limit amount Tpg to the mechanical brake torque. When the output shaft torque limit amount Tpg is equal to or larger than zero ((Tpg≥0), the mechanical brake torque correcting unit 46 sets the command mechanical torque to the value of the mechanical torque. The mechanical brake is controlled based on this command mechanical brake torque.

After the computation of the engine shaft demand MG torque Tem and the output shaft demand MG torque Tpm, in a case where it is determined that the vehicle is not in the EV drive mode through a switch unit (serving as a setting section) 47 based on an EV drive flag, and it is determined that the engine 10 is not in a cranking state, i.e., an engine starting state, in which the engine 10 is cranking, through a switch unit (serving as a setting section) 48 based on a cranking flag, the engine shaft demand MG torque Tem, which is computed at the F/B control unit 37, is directly used.

In contrast, when it is determined that the vehicle is in the EV drive mode through the switch unit 47, the engine shaft demand MG torque Tem is set to zero (i.e., Tem=0) at the switch unit 47. In this way, at the time of driving the vehicle in the EV drive mode, it is possible to limit an increase in the loss caused by the driving of the engine 10, which is in the engine stop state (combustion stop state), by the drive force provided by the first and second MGs 11, 12.

Furthermore, in the case where it is determined that the engine 10 is in the cranking state, i.e., the engine starting state through the switch unit 48, the engine shaft demand MG torque Tem is set to a value of a cranking torque Tcr (i.e., Tem=Tcr) at the switch unit 48. This cranking torque (also referred to as a required cranking torque) Tcr is a torque required for the cranking of the engine 10. A cranking torque computing unit 49 computes the cranking torque Tcr based on the actual engine rotational speed Ne through use of, for example, a map. Thereby, the engine 10 can be reliably started by cranking the engine with the drive force provided by the first and second MGs 11, 12.

Thereafter, an MG torque command value computing unit 50 computes the torque command value Tmg1 of the first MG 11 and the torque command value Tmg2 of the second MG 12 through use of the equation of torque equilibrium, which corresponds to the drive force transmission arrangement 15, based on the engine shaft demand MG torque Tem and the output shaft demand MG torque Tpm.

In this instance, the following equation (1) is used as the equation of torque equilibrium, which corresponds to the drive force transmission arrangement 15.

$$\begin{bmatrix} Tmg1 \\ Tmg2 \end{bmatrix} = \begin{bmatrix} \frac{-(\rho1 + \rho1\rho2 + \rho2)}{(1+\rho1)(1+\rho2)} & \frac{-\rho2(1+\rho1)}{(1+\rho1)(1+\rho2)} \\ \frac{-1}{(1+\rho1)(1+\rho2)} & \frac{-(1+\rho1)}{(1+\rho1)(1+\rho2)} \end{bmatrix} \begin{bmatrix} Tem \\ Tpm \end{bmatrix} \quad \text{Equation (1)}$$

Here, ρ1 denotes a planetary ratio (a ratio between the number of the teeth of the sun gear S and the number of the teeth of the ring gear R) of the first planetary gear mechanism 13, and ρ2 denotes a planetary ratio (a ratio between the number of the teeth of the sun gear S and the number of the teeth of the ring gear R) of the second planetary gear mechanism 14.

The torque of the first MG 11 and the torque of the second MG 12 are controlled based on the torque command value Tmg1 of the first MG 11 and the torque command value Tmg2 of the second MG 12, respectively.

In the present embodiment, the computation of the torque command values of the first and second MGs 11, 12 is executed by the hybrid ECU 24 according to the respective routines shown in FIGS. 4 to 9. The procedure of each of these routines will now be described in detail.

Figure 4:
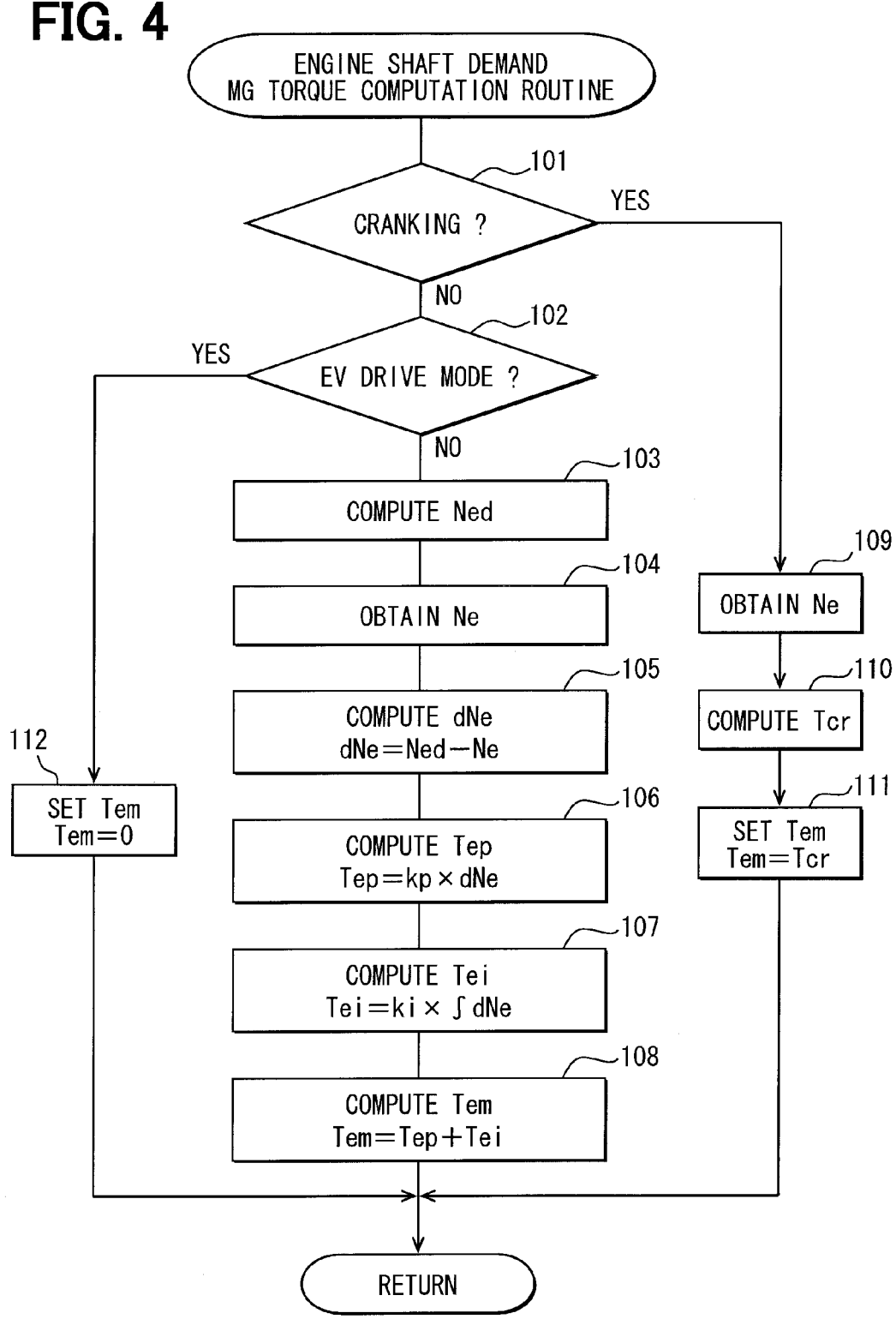
FIG. 4 is a flowchart showing a flow of an engine shaft demand MG torque computation routine of the first embodiment.

An engine shaft demand MG torque computation routine of FIG. 4 is executed repeatedly at predetermined time intervals during a power source ON time period of the hybrid ECU 24 (a time period, during which an electric power source of the hybrid ECU 24 is turned on) and serves as an engine shaft demand motor generator torque computing section (an engine shaft demand motor generator torque computing means) of the hybrid ECU 24. When the present routine is started, the operation proceeds to step 101. At step 101, it is determined whether the engine 10 is in the cranking state (the engine starting state). When it is determined that the engine 10 is not in the cranking state (the engine starting state) at step 101, the operation proceeds to step 102. At step 102, it is determined whether the vehicle is in the EV drive mode.

When it is determined that the vehicle is not in the EV drive mode at step 102, the operation proceeds to step 103. At step 103, the target engine rotational speed Ned is computed based on the target engine output Ped with reference to the map of the target engine rotational speed Ned. The map of the target engine rotational speed Ned is formed in advance based on, for example, the test data and/or the design data and is stored in the ROM of the hybrid ECU 24.

Thereafter, the operation proceeds to step 104. At step 104, the actual engine rotational speed Ne, which is sensed with the engine rotational speed sensor (not shown), is obtained. Then, the operation proceeds to step 105. At step 105, a difference dNe between the target engine rotational speed Ned and the actual engine rotational speed Ne is computed.

$$dNe=Ned-Ne$$

Thereafter, the operation proceeds to step 106. At step 106, a proportional Tep of the F/B control operation is computed through use of the following equation based on the difference dNe and a proportional gain Kp.

$$Tep=Kp \times dNe$$

Thereafter, the operation proceeds to step 107. At step 107, an integral Tei of the F/B control operation is computed through use of the following equation based on the difference dNe and an integral gain Ki.

$$Tei=Ki \times \int dNe$$

Thereafter, the operation proceeds to step 108. At step 108, the engine shaft demand MG torque Tem is computed through use of the following equation based on the proportional Tep and the integral Tei.

$$Tem=Tep+Tei$$

When it is determined that the engine 10 is in the cranking state at step 101, the operation proceeds to step 109. At step 109, the actual engine rotational speed Ne, which is sensed with the engine rotational speed sensor (not shown), is obtained. Thereafter, the operation proceeds to step 110. At step 110, the cranking torque Tcr (the torque required to crank the engine 10) is computed based on the actual engine rotational speed Ne with reference to a map of the cranking torque Tcr. The map of the cranking torque Tcr is formed in advance based on, for example, the test data and/or the design data and is stored in the ROM of the hybrid ECU 24.

Thereafter, the operation proceeds to step 111. At step 111, the engine shaft demand MG torque Tem is set to the value of the cranking torque Tcr.

$$Tem=Tcr$$

Furthermore, at step 102, when it is determined that the vehicle is in the EV drive mode, the operation proceeds to step 112. At step 112, the engine shaft demand MG torque Tem is set to zero (0).

$$Tem=0$$

Figure 5:
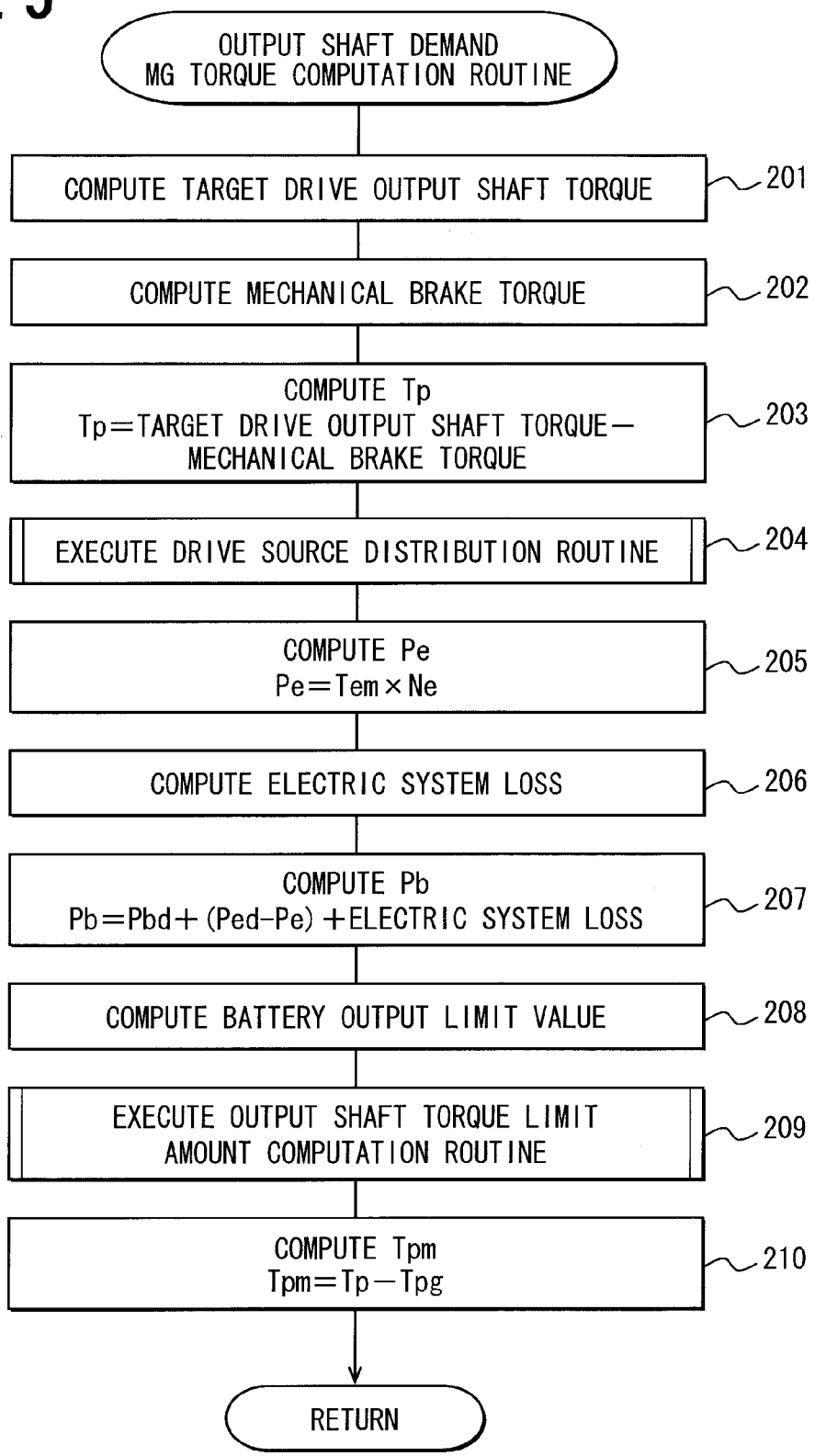
FIG. 5 is a flowchart showing a flow of an output shaft demand MG torque computation routine of the first embodiment.

An output shaft demand MG torque computation routine of FIG. 5 is executed repeatedly at predetermined time intervals during the power source ON time period of the hybrid ECU 24 and serves as an output shaft demand motor generator torque computing section (an output shaft demand motor generator torque computing means) of the hybrid ECU 24. When the present routine is started, at step 201, the target drive output shaft torque is computed based on, for example, the vehicle speed, the degree of depression of the accelerator pedal (more specifically, the information that directly or indirectly indicates the degree of depression of the accelerator pedal), the shift position and the degree of depression of the brake pedal (more specifically, the information that directly or indirectly indicates the degree of depression of the brake pedal) in view of the map of the target drive output shaft torque. The target drive output shaft torque will be the positive value when the torque is exerted in the driving direction of the drive force output shaft 17. In contrast, the target drive output shaft torque will be the negative value when the torque is exerted in the braking direction of the drive force output shaft 17. The map of the target drive output shaft torque is formed in advance based on, for example, the test data and/or the design data and is stored in the ROM of the hybrid ECU 24.

Thereafter, the operation proceeds to step 202. At step 202, the mechanical brake torque is computed based on, for example, the vehicle speed and the degree of depression of the brake pedal (more specifically, the information that directly or indirectly indicates the degree of depression of the brake pedal) with reference to the map of the mechanical brake torque. The map of the mechanical brake torque is formed in advance based on, for example, the test data and/or the design data and is stored in the ROM of the hybrid ECU 24.

Thereafter, the operation proceeds to step 203. At step 203, the output shaft demand torque Tp is computed by subtracting the mechanical brake torque from the target drive output shaft torque.

$$Tp = \text{Target drive output shaft torque} - \text{Mechanical brake torque}$$

Then, the operation proceeds to step 204. At step 204, a drive source distribution routine of FIG. 6 described later is executed to compute the target battery output Pbd and the target engine output Ped.

Thereafter, the operation proceeds to step 205. At step 205, the actual engine output Pe (the estimate value) after the feedback control operation is computed by multiplying the engine shaft demand MG torque Tem by the actual engine rotational speed Ne.

$$Pe=Tem \times Ne$$

Then, the operation proceeds to step 206. At step 206, the electric system loss of, for example, the first and second MGs 11, 12, the first and second inverters 21, 22 and the battery 23 in conformity with the state of the vehicle, is computed with reference to the map of the electric system loss. The map of the electric system loss is formed in advance based on, for example, the test data and/or the design data and is stored in the ROM of the hybrid ECU 24.

Then, the operation proceeds to step 207. At step 207, the battery output estimate value Pb is computed by adding the electric system loss and the difference (i.e., Ped−Pe) between the target engine output Ped and the actual engine output Pe to the target battery output Pbd.

$$Pb=Pbd+(Ped-Pe)+\text{Electric system loss}$$

Thereafter, the operation proceeds to step 208. At step 208, the battery output limit value is computed based on the charge state and/or the temperature of the battery 23 with reference to the map of the battery output limit value. In this case, the discharging-side output limit value (the positive value) and the charging-side output limit value (the negative value) are computed as the battery output limit values. The map of the battery output limit value is formed in advance based on, for example, the test data and/or the design data and is stored in the ROM of the hybrid ECU 24.

Thereafter, the operation proceeds to step 209. At step 209, the output shaft torque limit amount Tpg is computed by executing an output shaft torque limit amount computation routine of FIG. 7 described later.

Then, the operation proceeds to step 210. At step 210, the output shaft demand MG torque Tpm is computed by subtracting the output shaft torque limit amount Tpg from the output shaft demand torque Tp.

$$Tpm=Tp-Tpg$$

Figure 6:
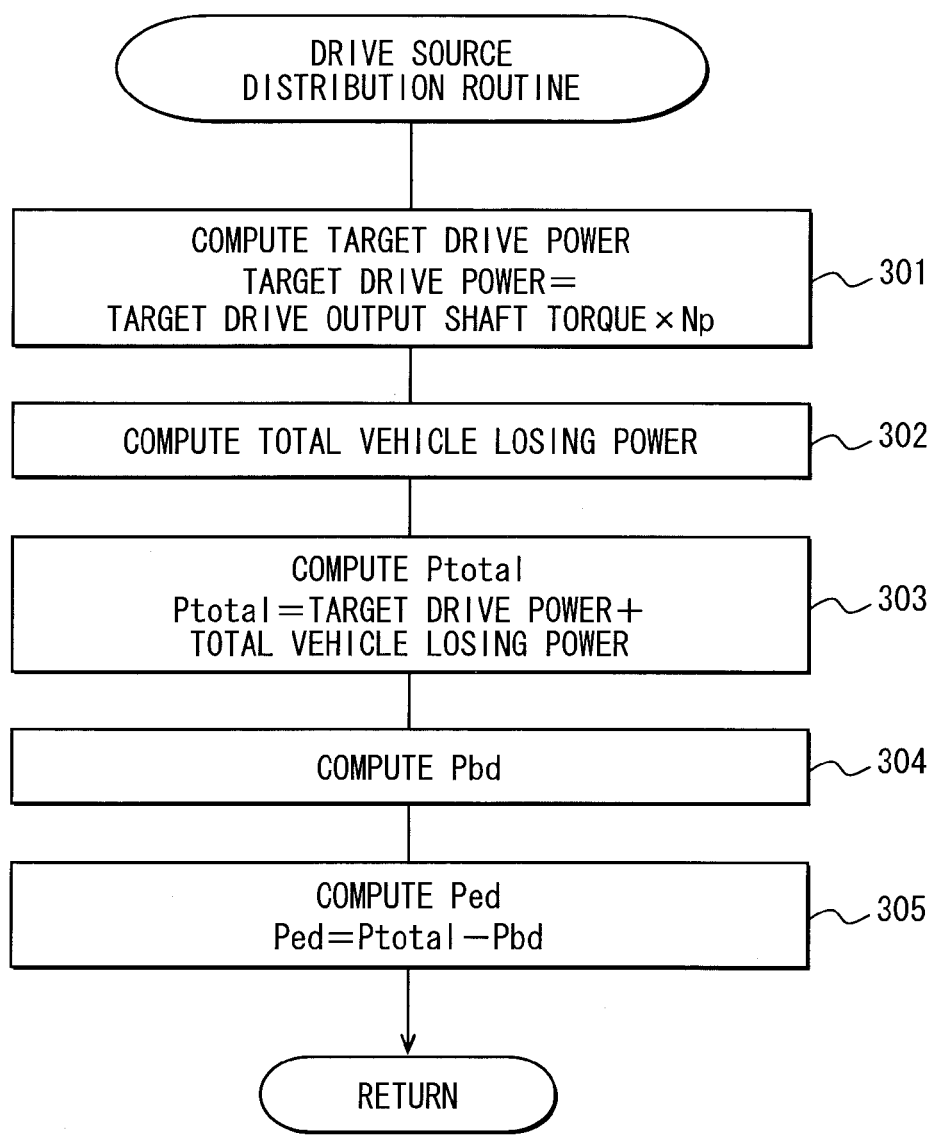
FIG. 6 is a flowchart showing a drive source distribution routine of the first embodiment.

The drive source distribution routine of FIG. 6 (serving as a drive source distributing section of the hybrid ECU 24) is a sub-routine executed at step 204 of the output shaft demand MG torque computation routine of FIG. 5. When the present routine is started, the operation proceeds to step 301. At step 301, the target drive power is computed by multiplying the target drive output shaft torque by the drive force output shaft rotational speed Np (the rotational speed of the drive force output shaft 17), which is obtained based on the vehicle speed.

Target drive power=Target drive output shaft torque×*Np*

Thereafter, the operation proceeds to step 302. At step 302, the total vehicle losing power is computed based on, for example, the vehicle speed and the target drive output shaft torque with reference to the map of the total vehicle losing power. The map of the total vehicle losing power is formed in advance based on, for example, the test data and/or the design data and is stored in the ROM of the hybrid ECU 24.

Thereafter, the operation proceeds to step 303. At step 303, the total demand power Ptotal is computed by adding the total vehicle losing power to the target drive power.

*P*total=Target drive power+Total vehicle losing power

Then, the operation proceeds to step 304. At step 304, the target battery output Pbd is computed based on the vehicle state. In this case, for example, at the time of driving the vehicle in the EV drive mode, the target battery output Pbd is set to the value of the total demand power Ptotal. Furthermore, at the time of assisting the acceleration of the vehicle, the target battery output Pbd is set to a predetermined value P1 (0<P1<Ptotal). Furthermore, at the time of charging the battery, the target battery output Pbd is set to a predetermined value P2 (P2<0).

Thereafter, the operation proceeds to step 305. At step 305, the target engine output Ped is computed by subtracting the target battery output Pbd from the total demand power Ptotal.

*Ped*=*P*total−*Pbd*

Figure 7:
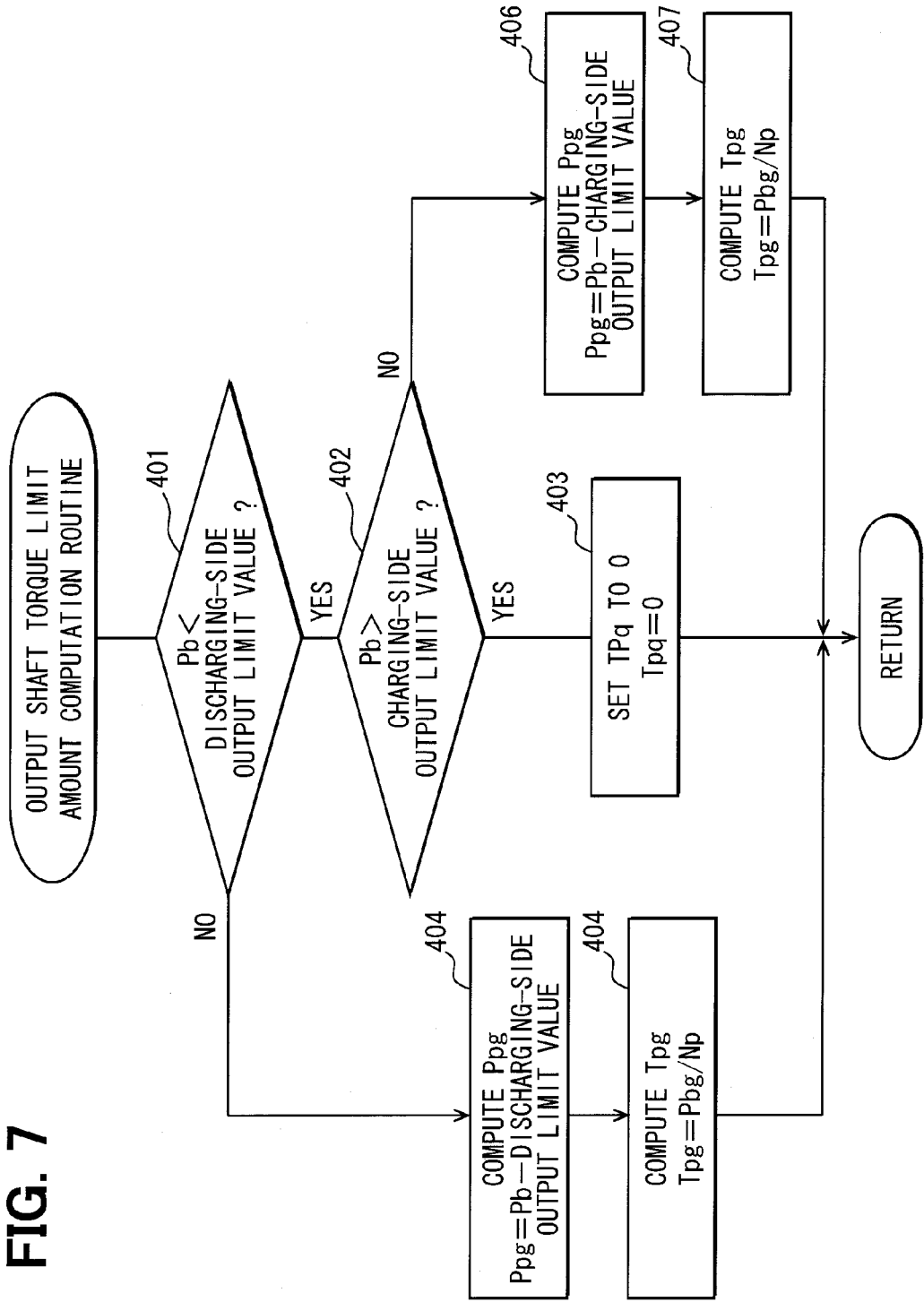
FIG. 7 is a flowchart showing an output shaft torque limit amount computation routine of the first embodiment.

The output shaft torque limit amount computation routine of FIG. 7 (serving as an output shaft torque limit amount computing section of the hybrid ECU 24) is a sub-routine executed at step 209 of the output shaft demand MG torque computation routine of FIG. 5. When the present routine is started, the operation proceeds to step 401. At step 401, it is determined whether the battery output estimate value Pb is smaller than the discharging-side output limit value. When it is determined that the battery output estimate value Pb is smaller than the discharging-side output limit value at step 401, the operation proceeds to step 402. At step 402, it is determined whether the battery output estimate value Pb is larger than the charging-side output limit value.

In the case where it is determined that the battery output estimate value Pb is smaller than the discharging-side output limit value at step 401, and it is determined that the battery output estimate value Pb is larger than the charging-side output limit value at step 402, the operation proceeds to step 403. At step 403, the output shaft torque limit amount Tpg is set to zero (0).

*Tpg*=0

In contrast, when it is determined that the battery output estimate value Pb is equal to or larger than the discharging-side output limit value at step 401, the operation proceeds to step 404. At step 404, the output shaft power limit amount Ppg is computed by subtracting the discharging-side output limit value from the battery output estimate value Pb.

*Ppg*=*Pb*−Discharging-side output limit value

Thereafter, the operation proceeds to step 405. At step 405, the output shaft torque limit amount Tpg is computed by dividing the output shaft power limit amount Ppg by the drive force output shaft rotational speed Np.

*Tpg*=*Ppg/Np*

In contrast, when it is determined that the battery output estimate value Pb is equal to or smaller than the charging-side output limit value at step 402, the operation proceeds to step 406. At step 406, the output shaft power limit amount Ppg is computed by subtracting the charging-side output limit value from the battery output estimate value Pb.

*Ppg*=*Pb*−Charging-side output limit value

Thereafter, the operation proceeds to step 407. At step 407, the output shaft torque limit amount Tpg is computed by dividing the output shaft power limit amount Ppg by the drive force output shaft rotational speed Np.

*Tpg*=*Ppg/Np*

Figure 8:
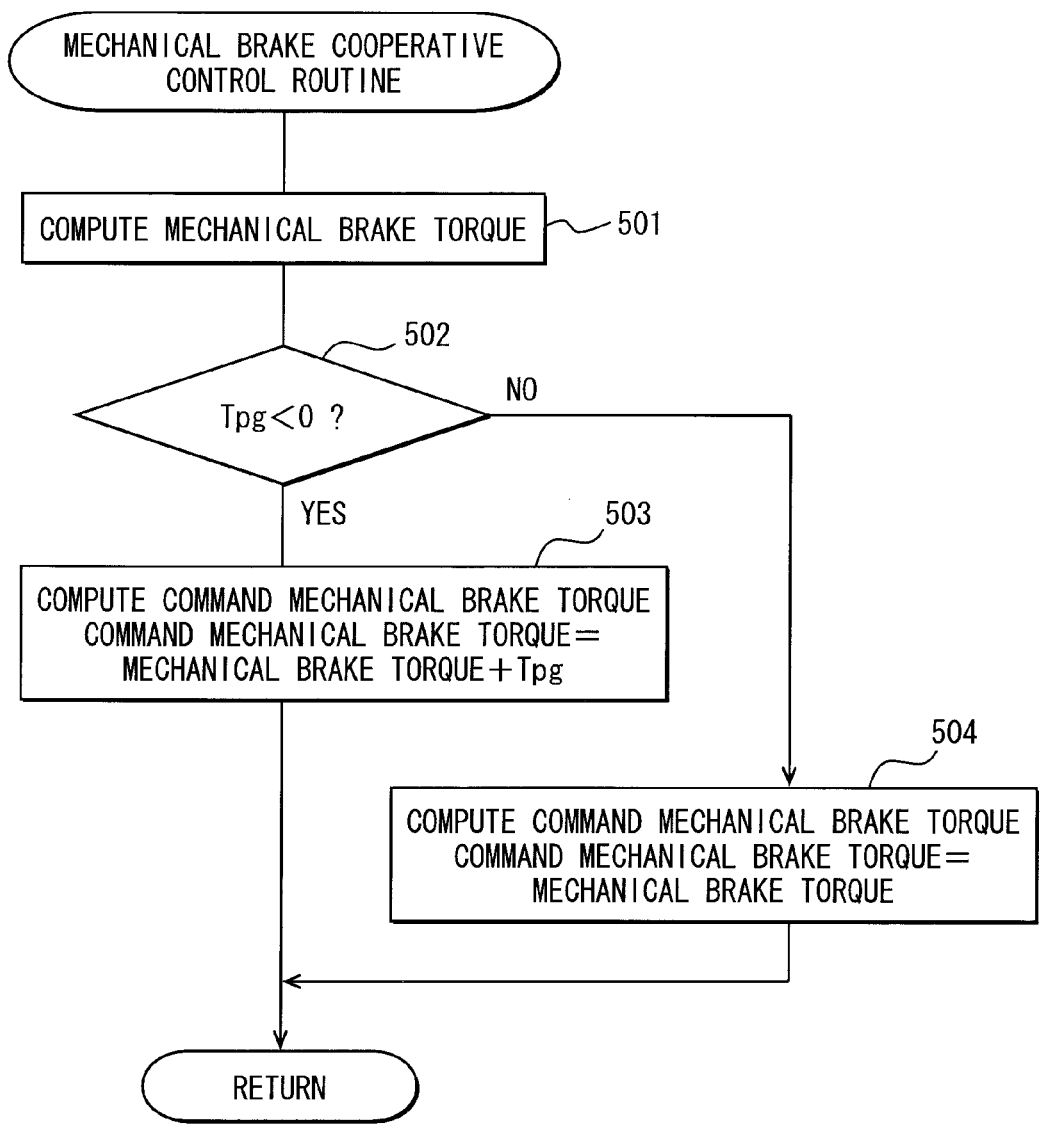
FIG. 8 is a flowchart showing a mechanical brake cooperative control routine of the first embodiment.

A mechanical brake cooperative control routine of FIG. 8 (serving as a mechanical brake cooperative controlling section of the hybrid ECU 24) is repeatedly executed during the power source ON time period of the hybrid ECU 24. When the present routine is started, the operation proceeds to step 501. At step 501, the mechanical brake torque is computed based on, for example, the vehicle speed and the degree of depression of the brake pedal (more specifically, the information that directly or indirectly indicates the degree of depression of the brake pedal) with reference to the map of the mechanical brake torque. The map of the mechanical brake torque is formed in advance based on, for example, the test data and/or the design data and is stored in the ROM of the hybrid ECU 24.

Thereafter, the operation proceeds to step 502. At step 502, it is determined whether the output shaft torque limit amount Tpg is smaller than zero. When it is determined that the output shaft torque limit amount Tpg is smaller than zero at step 502, the operation proceeds to step 503. At step 503, the command mechanical brake torque is computed by adding the output shaft torque limit amount Tpg to the mechanical brake torque.

Command mechanical brake torque=Mechanical brake torque+*Tpg*

When it is determined that the output shaft torque limit amount Tpg is equal to or larger than zero at step 502, the operation proceeds to step 504. At step 504, the command mechanical brake torque is set (computed) to the value of the mechanical brake torque.

Command mechanical brake torque=Mechanical brake torque

Figure 9:
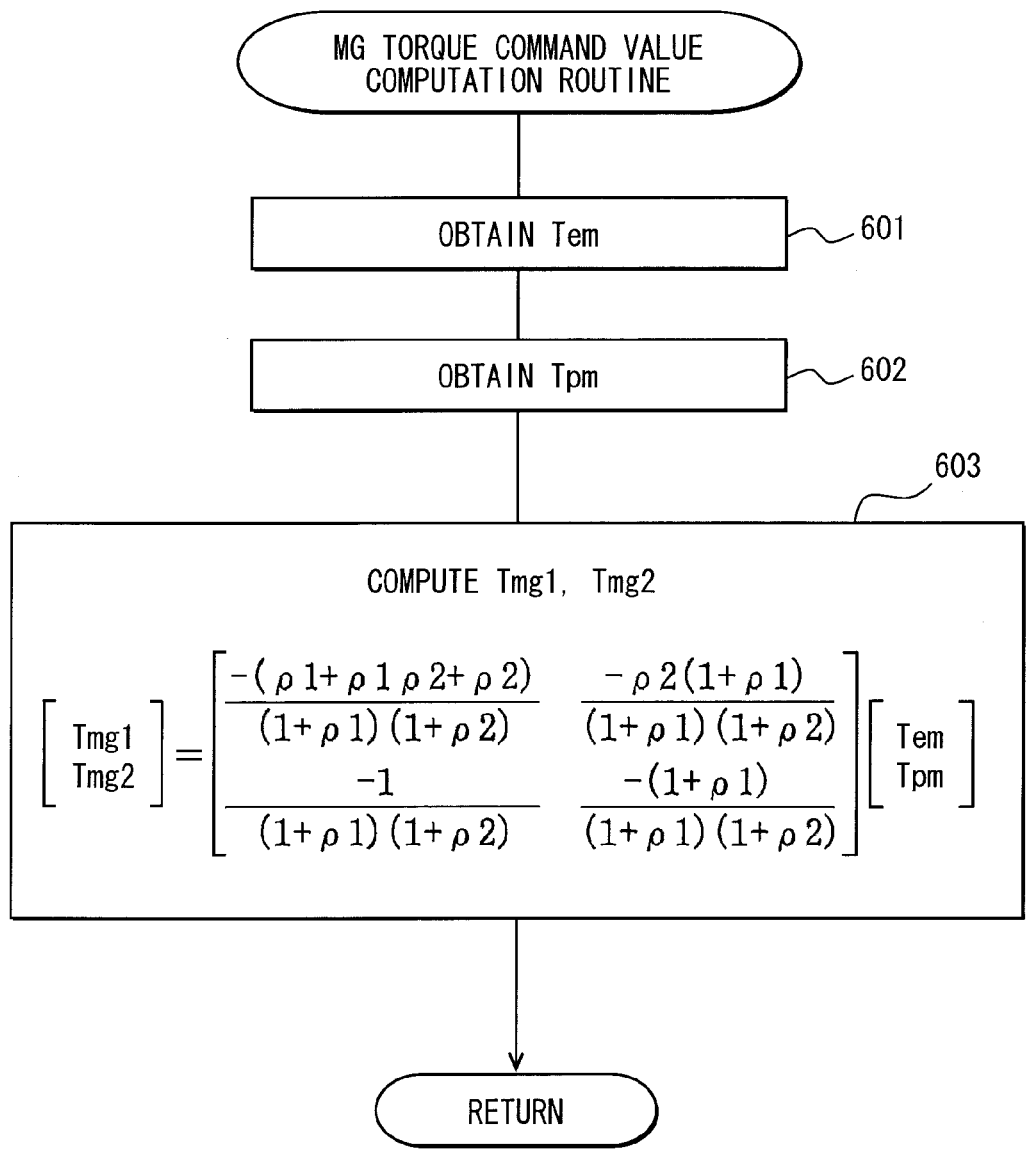
FIG. 9 is a flowchart showing a flow of an MG torque command value computation routine of the first embodiment.

An MG torque command value computation routine of FIG. 9 is executed repeatedly at predetermined time intervals during the power source ON time period of the hybrid ECU 24 and serves as a motor generator torque command value computing section (a motor generator torque command value computing means) of the hybrid ECU 24. When the present routine is started, the operation proceeds to step 601. At step 601, the engine shaft demand MG torque Tem, which is computed at the engine shaft demand MG torque computation routine of FIG. 4, is retrieved, i.e., obtained. Then, the operation proceeds to step 602. At step 602, the output shaft demand MG torque Tpm, which is computed at the output shaft demand MG torque computation routine of FIG. 5, is retrieved, i.e., is obtained.

Thereafter, the operation proceeds to step 603. At step 603, the torque command value Tmg1 of the first MG 11 and the torque command value Tmg2 of the second MG 12 are computed through use of the above equation (1) based on the engine shaft demand MG torque Tem and the output shaft demand MG torque Tpm. As noted above, the above equation (1) is the equation of torque equilibrium, which corresponds to the drive force transmission arrangement 15.

In the first embodiment described above, first of all, the engine shaft demand MG torque and the output shaft demand MG torque are computed. The engine shaft demand MG torque is the torque required by the engine shaft 16 and is provided from the first and second MGs 11, 12 to control the engine rotational speed. The output shaft demand MG torque is the torque required by the drive force output shaft 17 and is provided from the first and second MGs 11, 12 to limit the input and output of the electric power at the battery 23. Then, the torque command value of the first MG 11 and the torque command value of the second MG 12 are computed through use of the equation of torque equilibrium, which corresponds to the drive force transmission arrangement 15, based on the engine shaft demand MG torque and the output shaft demand MG torque. Therefore, it is possible to easily set the torque command value of the first MG 11 and the torque command value of the second MG 12, which are required to achieve the three objectives, i.e., the controlling of the rotational speed of the engine, the controlling of the output torque and the limiting of the input and output of the electric power at the battery 23, so that the torques of the first and second MGs 11, 12 can be cooperatively controlled. Thereby, the three objectives, i.e., the controlling of the rotational speed of the engine, the controlling of the output torque and the limiting of the input and output of the electric power at the battery 23 can be achieved without complicating the control operation of the first and second MGs 11, 12.

Furthermore, in the first embodiment, the planetary gear mechanisms 13, 14 are used as the drive-force dividing mechanisms of the drive force transmission arrangement 15. Therefore, the structure of the drive force transmission arrangement 15 is simplified to enable the low costs.

The positional relationship of each of the sun gear S, the ring gear R and the planetary carrier C of each planetary gear mechanism relative to the corresponding shaft (the corresponding one of the engine shaft, the drive force output shaft and the rotatable shaft of the MG) is not limited to the one shown in FIG. 1. That is, the combination of each shaft (each of the engine shaft, the drive force output shaft and the rotatable shaft of the MG) and the corresponding one of the sun gear S, the ring gear R and the planetary carrier C of the corresponding planetary gear mechanism is not limited to the one shown in FIG. 1 and may be modified in any appropriate manner within the principle of the present disclosure.

Next, second to ninth embodiments of the present disclosure will be described with reference to FIGS. 10 to 20. In the following description, components, which are similar to those of the first embodiment, will be indicated by the same reference numerals and will not be described redundantly for the sake of simplicity.

Second Embodiment

Figure 10:
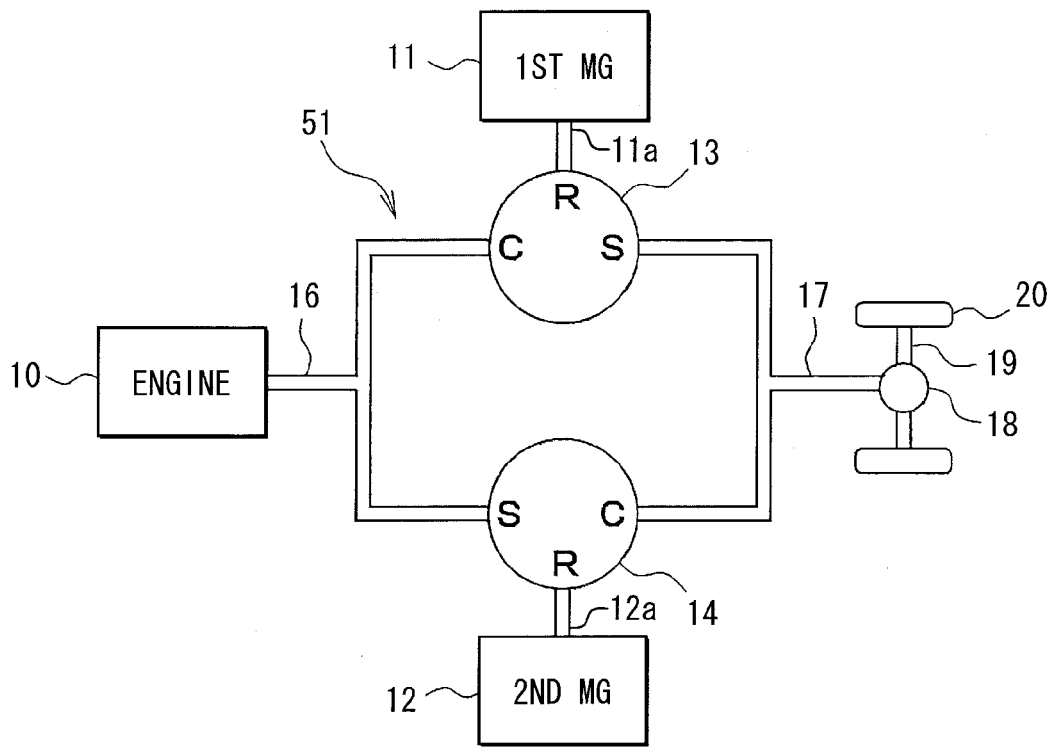
FIG. 10 is a schematic diagram showing a structure of a drive force transmission arrangement and therearound according to a second embodiment of the present disclosure.

In a second embodiment of the present disclosure, as shown in FIG. 10, the drive force transmission arrangement 51 is constructed as follows. That is, the engine shaft 16, the planetary carrier C of the first planetary gear mechanism 13 and the sun gear S of the second planetary gear mechanism 14 are interconnected with each other in a manner that enables conduction of the drive force therebetween. The ring gear R of the first planetary gear mechanism 13 and the rotatable shaft 11a of the first MG 11 are interconnected with each other in a manner that enables conduction of the drive force therebetween. Furthermore, the sun gear S of the first planetary gear mechanism 13, the planetary carrier C of the second planetary gear mechanism 14 and the drive force output shaft 17 are interconnected with each other in a manner that enables conduction of the drive force therebetween. The ring gear R of the second planetary gear mechanism 14 and the rotatable shaft 12a of the second MG 12 are interconnected with each other in a manner that enables conduction of the drive force therebetween.

In the second embodiment, at the time of computing the torque command value Tmg1 of the first MG 11 and the torque command value Tmg2 of the second MG 12 through use of the equation of torque equilibrium, which corresponds to the drive force transmission arrangement 51, based on the engine shaft demand MG torque Tem and the output shaft demand MG torque Tpm, the hybrid ECU 24 uses the following equation (2) as the equation of torque equilibrium, which corresponds to the drive force transmission arrangement 51.

$$\begin{bmatrix} Tmg1 \\ Tmg2 \end{bmatrix} = \begin{bmatrix} \dfrac{-\rho 1(1+\rho 2)}{1+\rho 1+\rho 1\rho 2} & \dfrac{-\rho 1\rho 2}{1+\rho 1+\rho 1\rho 2} \\ \dfrac{-1}{1+\rho 1+\rho 1\rho 2} & \dfrac{-1-\rho 1}{1+\rho 1+\rho 1\rho 2} \end{bmatrix} \begin{bmatrix} Tem \\ Tpm \end{bmatrix} \quad \text{Equation (2)}$$

The positional relationship of each of the sun gear S, the ring gear R and the planetary carrier C of each planetary gear mechanism relative to the corresponding shaft (the corresponding one of the engine shaft, the drive force output shaft and the rotatable shaft of the MG) is not limited to the one shown in FIG. 10. That is, the combination of each corresponding shaft (each of the engine shaft, the drive force output shaft and the rotatable shaft of the MG) and the corresponding one of the sun gear S, the ring gear R and the planetary carrier C of the corresponding planetary gear mechanism is not limited to the one shown in FIG. 10 and may be modified in any appropriate manner within the principle of the present disclosure.

Third Embodiment

Figure 11:
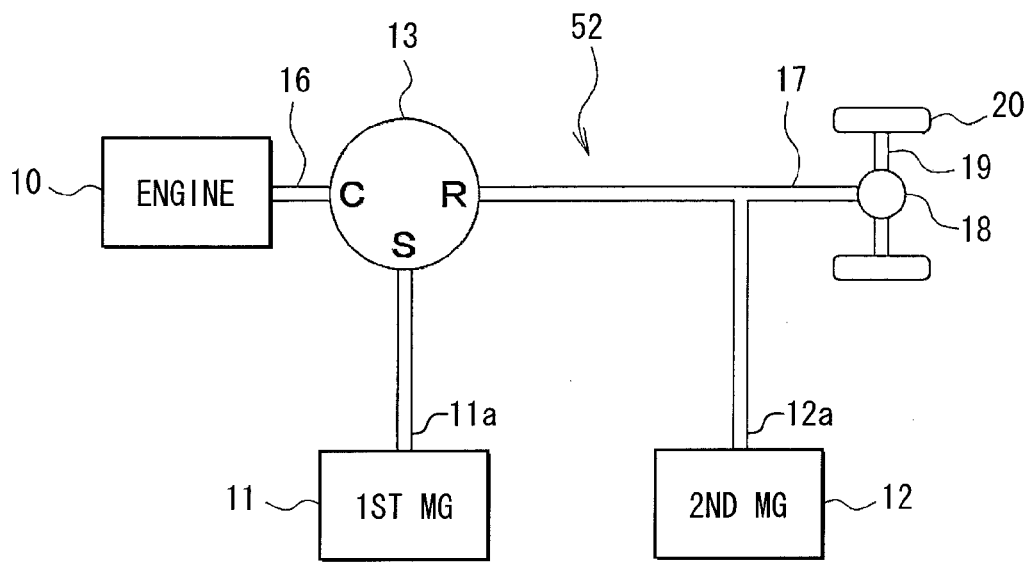
FIG. 11 is a schematic diagram showing a structure of a drive force transmission arrangement and therearound according to a third embodiment of the present disclosure.

In a third embodiment of the present disclosure, as shown in FIG. 11, the drive force transmission arrangement 52 is constructed as follows. That is, the engine shaft 16 and the planetary carrier C of the first planetary gear mechanism 13 are interconnected with each other in a manner that enables conduction of the drive force therebetween. The sun gear S of the first planetary gear mechanism 13 and the rotatable shaft 11a of the first MG 11 are interconnected with each other in a manner that enables conduction of the drive force therebetween. Furthermore, the ring gear R of the first planetary gear mechanism 13, the rotatable shaft 12a of the second MG 12 and the drive force output shaft 17 are interconnected with each other in a manner that enables conduction of the drive force therebetween.

In the third embodiment, at the time of computing the torque command value Tmg1 of the first MG 11 and the torque command value Tmg2 of the second MG 12 through use of the equation of torque equilibrium, which corresponds to the drive force transmission arrangement 52, based on the engine shaft demand MG torque Tem and the output shaft demand MG torque Tpm, the hybrid ECU 24 uses the following equation (3) as the equation of torque equilibrium, which corresponds to the drive force transmission arrangement 52.

$$\begin{bmatrix} Tmg1 \\ Tmg2 \end{bmatrix} = \begin{bmatrix} \dfrac{-\rho}{1+\rho} & 0 \\ \dfrac{-1}{1+\rho} & -1 \end{bmatrix} \begin{bmatrix} Tem \\ Tpm \end{bmatrix} \quad \text{Equation (3)}$$

The positional relationship of each of the sun gear S, the ring gear R and the planetary carrier C of the planetary gear mechanism relative to the corresponding shaft (the corresponding one of the engine shaft, the drive force output shaft and the rotatable shaft of the MG) is not limited to the one shown in FIG. 11. That is, the combination of each shaft (each of the engine shaft, the drive force output shaft and the rotatable shaft of the MG) and the corresponding one of the sun gear S, the ring gear R and the planetary carrier C of the planetary gear mechanism is not limited to the one shown in FIG. 11 and may be modified in any appropriate manner within the principle of the present disclosure.

Fourth Embodiment

Figure 12:
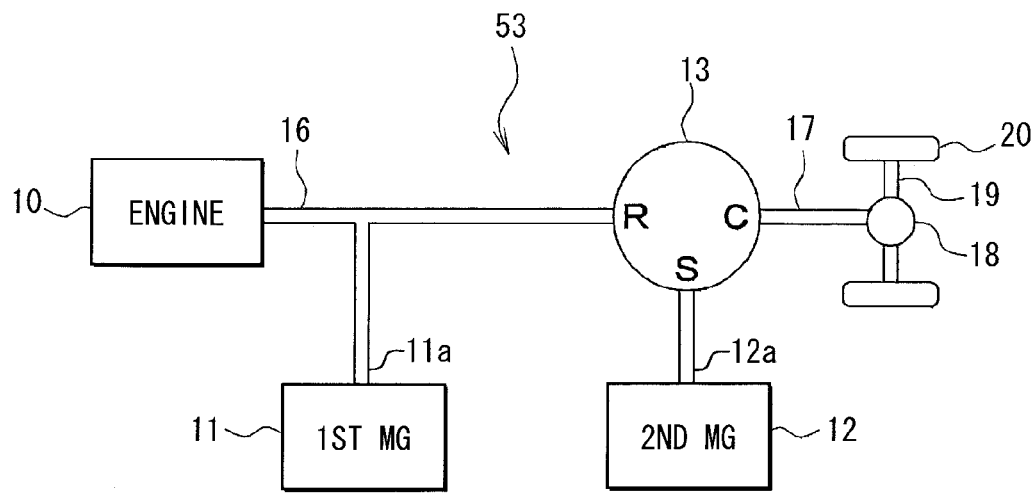
FIG. 12 is a schematic diagram showing a structure of a drive force transmission arrangement and therearound according to a fourth embodiment of the present disclosure.

In a fourth embodiment of the present disclosure, as shown in FIG. 12, the drive force transmission arrangement 53 is constructed as follows. That is, the engine shaft 16, the rotatable shaft 11a of the first MG 11 and the ring gear R of the first planetary gear mechanism 13 are interconnected with each other in a manner that enables conduction of the drive force therebetween. The sun gear S of the first planetary gear mechanism 13 and the rotatable shaft 12a of the second MG 12 are interconnected with each other in a manner that enables conduction of the drive force therebetween. Furthermore, the planetary carrier C of the first planetary gear mechanism 13 and the drive force output shaft 17 are interconnected with each other in a manner that enables conduction of the drive force therebetween.

The positional relationship of each of the sun gear S, the ring gear R and the planetary carrier C of the planetary gear mechanism relative to the corresponding shaft (the corresponding one of the engine shaft, the drive force output shaft and the rotatable shaft of the MG) is not limited to the one shown in FIG. 12. That is, the combination of each shaft (each of the engine shaft, the drive force output shaft and the rotatable shaft of the MG) and the corresponding one of the sun gear S, the ring gear R and the planetary carrier C of the planetary gear mechanism is not limited to the one shown in FIG. 12 and may be modified in any appropriate manner within the principle of the present disclosure.

Fifth Embodiment

Figure 13:
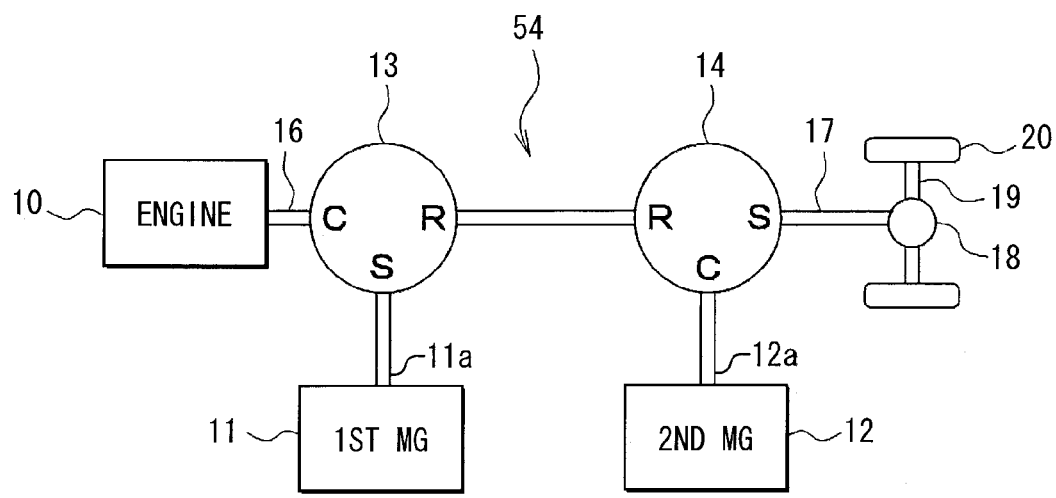
FIG. 13 is a schematic diagram showing a structure of a drive force transmission arrangement and therearound according to a fifth embodiment of the present disclosure.

In a fifth embodiment of the present disclosure, as shown in FIG. 13, the drive force transmission arrangement 54 is constructed as follows. That is, the engine shaft 16 and the planetary carrier C of the first planetary gear mechanism 13 are interconnected with each other in a manner that enables conduction of the drive force therebetween. The sun gear S of the first planetary gear mechanism 13 and the rotatable shaft 11a of the first MG 11 are interconnected with each other in a manner that enables conduction of the drive force therebetween. Furthermore, the ring gear R of the first planetary gear mechanism 13 and the ring gear R of the second planetary gear mechanism 14 are interconnected with each other in a manner that enables conduction of the drive force therebetween. The planetary carrier C of the second planetary gear mechanism 14 and the rotatable shaft 12a of the second MG 12 are interconnected with each other in a manner that enables conduction of the drive force therebetween. Furthermore, the sun gear S of the second planetary gear mechanism 14 and the drive force output shaft 17 are interconnected with each other in a manner that enables conduction of the drive force therebetween.

The positional relationship of each of the sun gear S, the ring gear R and the planetary carrier C of each planetary gear mechanism relative to the corresponding shaft (the corresponding one of the engine shaft, the drive force output shaft and the rotatable shaft of the MG) is not limited to the one shown in FIG. 13. That is, the combination of each shaft (each of the engine shaft, the drive force output shaft and the rotatable shaft of the MG) and the corresponding one of the sun gear S, the ring gear R and the planetary carrier C of the corresponding planetary gear mechanism is not limited to the one shown in FIG. 13 and may be modified in any appropriate manner within the principle of the present disclosure.

Even in the second to fifth embodiments discussed above, the hybrid ECU 24 computes the torque command value of the first MG 11 and the torque command value of the second MG 12 through use of the equation of torque equilibrium, which corresponds to the drive force transmission arrangement, based on the engine shaft demand MG torque and the output shaft demand MG torque. Thereby, the three objectives, i.e., the controlling of the rotational speed of the engine, the controlling of the output torque and the limiting of the input and output of the electric power at the battery can be achieved without complicating the control operation of the first and second MGs 11, 12.

Sixth Embodiment

Figure 14:
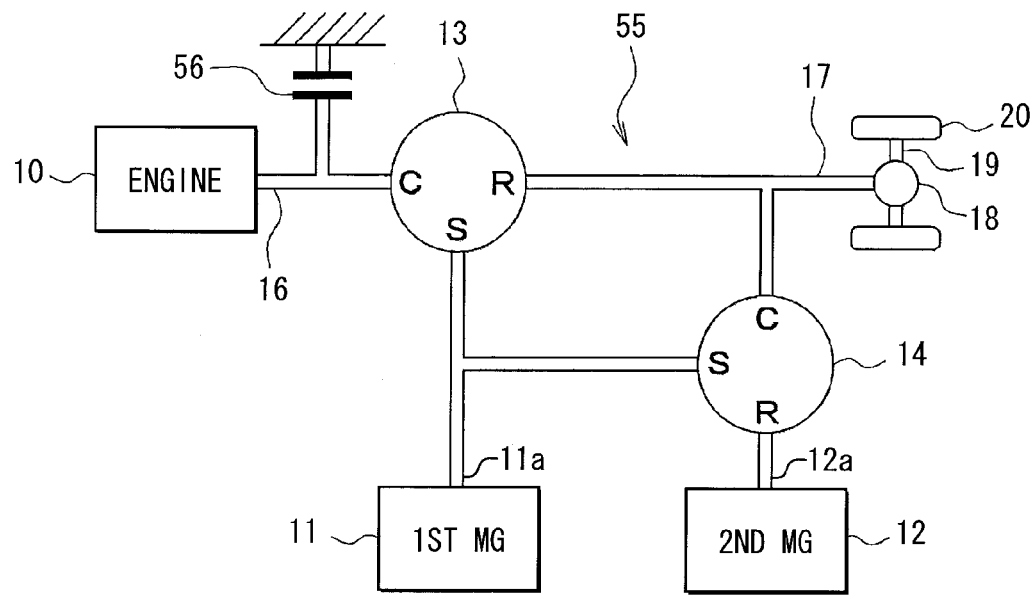
FIG. 14 is a schematic diagram showing an example of a structure of a drive force transmission arrangement and therearound according to a sixth embodiment of the present disclosure.
Figure 15:
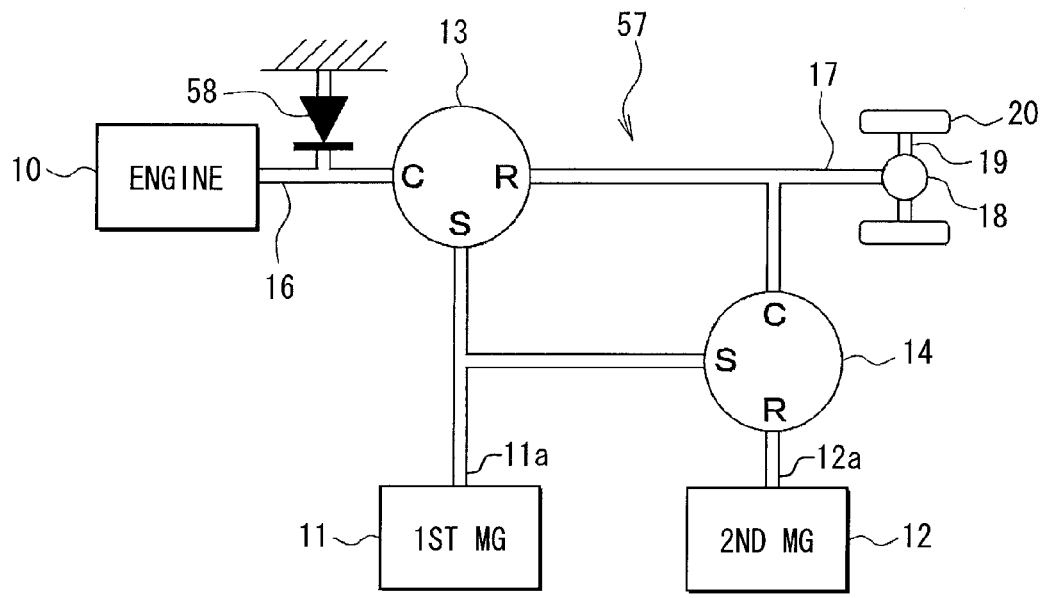
FIG. 15 is a schematic diagram showing another example of the structure of the drive force transmission arrangement and therearound according to the sixth embodiment of the present disclosure.

In a sixth embodiment of the present disclosure, as shown in FIG. 14, the drive force transmission arrangement 55 is constructed as follows. That is, a brake 56 is provided to the engine shaft 16, and the rest of the structure of the drive force transmission arrangement 55 is similar to the drive force transmission arrangement 15 (see FIG. 1) of the first embodiment. Alternatively, as shown in FIG. 15, the drive force transmission arrangement 57 may be constructed as follows. That is, a stationary-end-coupled one-way clutch 58, which is coupled to a predetermined stationary end (e.g., the housing of the drive force transmission arrangement 57), is provided to the engine shaft 16.

Figure 16:
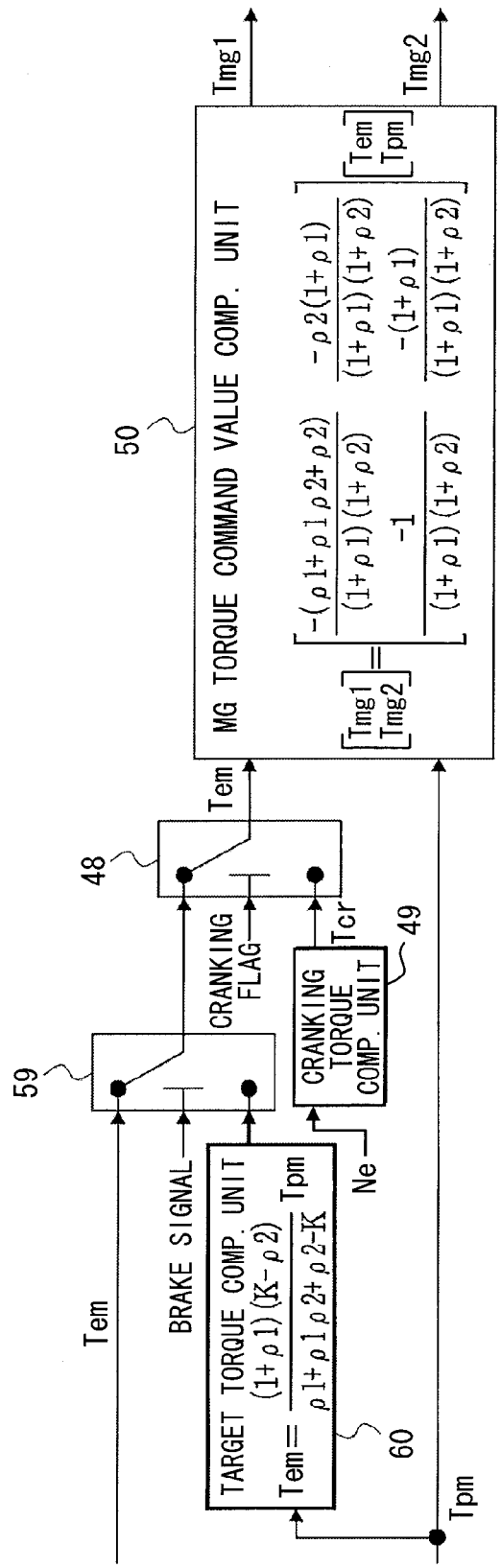
FIG. 16 is a block diagram showing a function of computing a torque command value of each MG according to the sixth embodiment.

In the sixth embodiment, with reference to FIG. 16, after the computation of the engine shaft demand MG torque Tem and the output shaft demand MG torque Tpm in a manner similar to that of the first embodiment (see FIG. 2), in a case where it is determined that the brake 56 or the stationary-end-coupled one-way clutch 58 is in a decoupled state (the brake 56 or the stationary-end-coupled one-way clutch 58 being switched to the side, at which the transmission of the drive force through the brake 56 or the stationary-end-coupled one-way clutch 58 is not limited) through the switch unit (serving as a setting section) 59, and it is determined that the engine 10 is not in the cranking state (the engine starting state, in which the engine 10 is cranking) through the switch unit (serving as the setting section) 48, the engine shaft demand MG torque Tem, which is computed at the F/B control unit 37 (see FIG. 2), is directly used. Thereby, the engine shaft demand MG torque Tem is computed in a manner that reduces (or minimizes) a difference between the target engine rotational speed and the actual engine rotational speed. In this way, in the case where it is determined that the brake 56 or the stationary-end-coupled one-way clutch 58 is in the decoupled state, the engine shaft demand MG torque Tem, which is required to control the actual engine rotational speed to the target engine rotational speed, can be accurately set.

In contrast, in the case where it is determined that the brake 56 or the stationary-end-coupled one-way clutch 58 is in the coupled state (the state where the rotation of the engine shaft 16 is prevented through the brake 56 or the stationary-end-coupled one-way clutch 58) through the switch unit 59, the engine shaft demand MG torque Tem is set to a predetermined torque at the switch unit 59.

In such a case, for instance, 0 (zero) may be used as the predetermined torque to set the engine shaft demand MG torque Tem to zero (i.e., Tem=0). In this way, in the coupled state of the brake 56 or the stationary-end-coupled one-way clutch 58, it is possible to limit application of an excessive load to the engine shaft 16, to which the brake 56 or the stationary-end-coupled one-way clutch 58 is provided.

Alternatively, a constant (a target urging torque), which is other than 0 (zero), may be used as the predetermined torque to set the engine shaft demand MG torque Tem to the constant (the target urging torque), which is other than 0 (zero). In this way, in the coupled state of the brake 56 or the stationary-end-coupled one-way clutch 58, the appropriate urging torque is applied to the engine shaft 16, to which the brake 56 or the stationary-end-coupled one-way clutch 58 is provided, so that generation of rotational vibration is limited.

Also, the engine shaft demand MG torque Tem may be set to a value (predetermined torque) computed by a target torque computing unit 60 through use of the following equation (4). The following equation (4) is the equation of torque equilibrium that is designed for the case where the engine shaft 16, to which the brake 56 or the stationary-end-coupled one-way clutch 58 is provided, serves as the stationary end.

$$Tem = \frac{(1+\rho 1)(K - \rho 2)}{\rho 1 + \rho 1 \rho 2 + \rho 2 - K} Tpm \quad \text{Equation (4)}$$

In the above equation (4), K denotes a distribution coefficient of the toque for the first MG 11 and the second MG 12.

In this way, the operational efficiencies of the first MG 11 and the second MG 12 can be improved by manipulating the working points of the first MG 11 and the second MG 12 through the manipulation of the distribution coefficient K.

The positional relationship of each of the sun gear S, the ring gear R and the planetary carrier C of each planetary gear mechanism relative to the corresponding shaft (the corresponding one of the engine shaft, the drive force output shaft and the rotatable shaft of the MG) is not limited to the one shown in FIG. 14 or FIG. 15. That is, the combination of each shaft (each of the engine shaft, the drive force output shaft and the rotatable shaft of the MG) and the corresponding one of the sun gear S, the ring gear R and the planetary carrier C of the corresponding planetary gear mechanism is not limited to the one shown in FIG. 14 or FIG. 15 and may be modified in any appropriate manner within the principle of the present disclosure.

Seventh Embodiment

Figure 17:
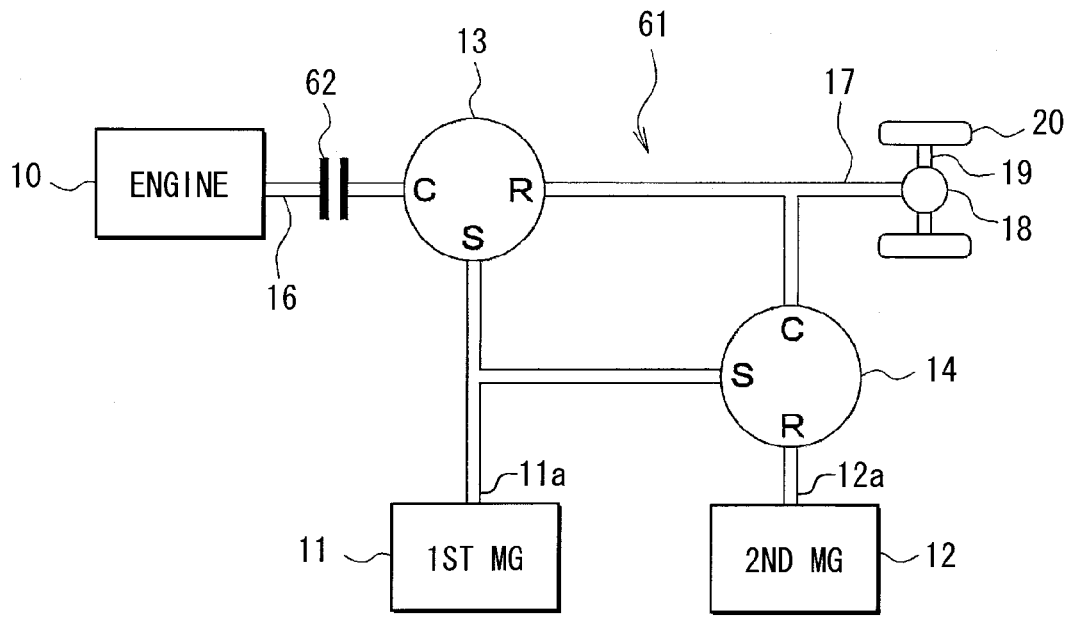
FIG. 17 is a schematic diagram showing an example of a structure of a drive force transmission arrangement and therearound according to a seventh embodiment of the present disclosure.
Figure 18:
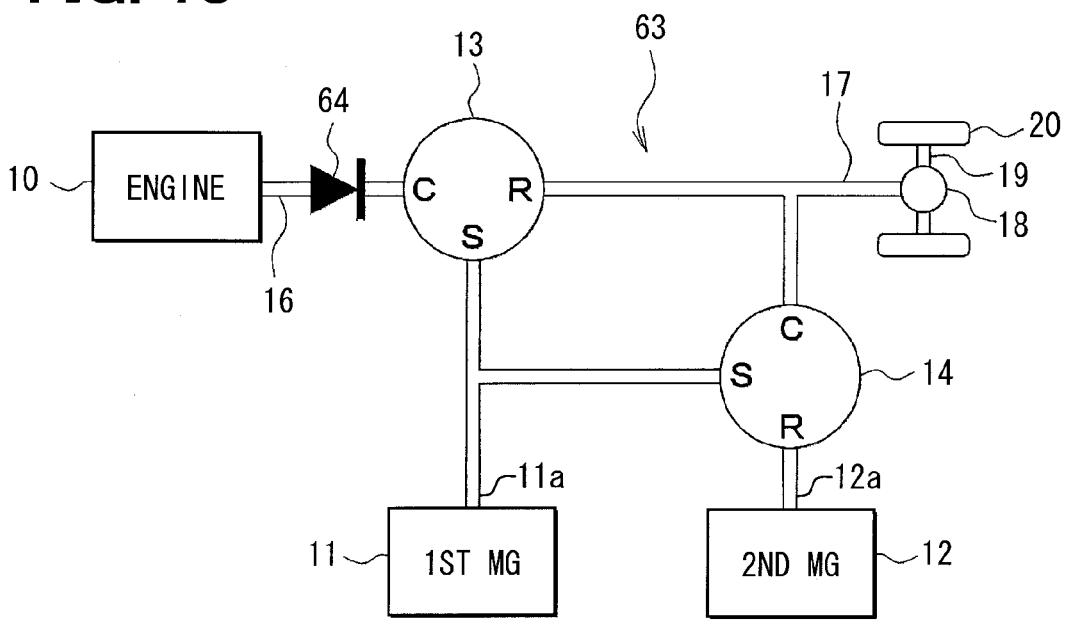
FIG. 18 is a schematic diagram showing another example of the structure of the drive force transmission arrangement and therearound according to the seventh embodiment of the present disclosure.

In a seventh embodiment of the present disclosure, as shown in FIG. 17, the drive force transmission arrangement 61 is constructed as follows. That is, a clutch 62 is provided to the engine shaft 16 to connect or disconnect the engine 10 relative to the planetary carrier C of the first planetary gear mechanism 13 through coupling or decoupling, respectively, of the clutch 62, and the rest of the structure of the drive force transmission arrangement 61 is similar to the drive force transmission arrangement 15 (see FIG. 1) of the first embodiment. Alternatively, as shown in FIG. 18, the drive force transmission arrangement 63 may be constructed as follows. That is, a one-way clutch 64 is provided to the engine shaft 16 to connect or disconnect the engine 10 relative to the planetary carrier C of the first planetary gear mechanism 13 through coupling or decoupling, respectively, of the one-way clutch 64.

In the seventh embodiment, after the computation of the engine shaft demand MG torque Tem and the output shaft demand MG torque Tpm in a manner similar to that of the first embodiment (see FIG. 2), in a case where it is determined that the clutch 62 or the one-way clutch 64 is in a coupled state (the clutch 62 or the one-way clutch 64 being switched to the side, at which the transmission of the drive force is not limited), and it is determined that the engine 10 is not in the cranking state (the engine starting state), the engine shaft demand MG torque Tem, which is computed at the F/B control unit 37 (see FIG. 2), is directly used. Thereby, the engine shaft demand MG torque Tem is computed in a manner that reduces (or minimizes) a difference between the target engine rotational speed and the actual engine rotational speed. In this way, in the case where the clutch 62 or the one-way clutch 64 is in the coupled state, the engine shaft demand MG torque Tem, which is required to control the actual engine rotational speed to the target engine rotational speed, can be accurately set.

In contrast, when it is determined that the clutch 62 or the one-way clutch 64 is in the decoupled state (the state of disabling the transmission of the drive force), the engine shaft demand MG torque Tem is set to zero (i.e., Tem=0). In this way, when the clutch 62 or the one-way clutch 64 is in the decoupled state, it is possible to limit the unnecessary free rotation of the clutch 62 or the one-way clutch 64 and thereby to limit the occurrence of the unnecessary loss.

The positional relationship of each of the sun gear S, the ring gear R and the planetary carrier C of each planetary gear mechanism relative to the corresponding shaft (the corresponding one of the engine shaft, the drive force output shaft and the rotatable shaft of the MG) is not limited to the one shown in FIG. 17 or FIG. 18. That is, the combination of each shaft (each of the engine shaft, the drive force output shaft and the rotatable shaft of the MG) and the corresponding one of the sun gear S, the ring gear R and the planetary carrier C of the corresponding planetary gear mechanism is not limited to the one shown in FIG. 17 or FIG. 18 and may be modified in any appropriate manner within the principle of the present disclosure.

Eighth Embodiment

Figure 19:
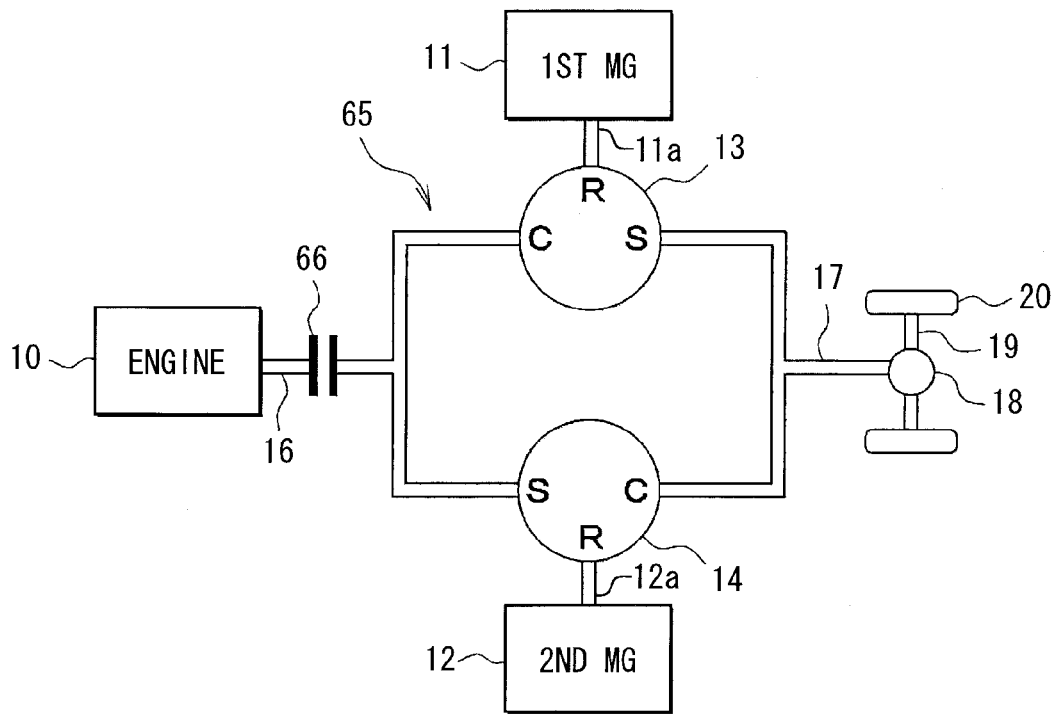
FIG. 19 is a schematic diagram showing a structure of a drive force transmission arrangement and therearound according to an eighth embodiment of the present disclosure.

In an eighth embodiment of the present disclosure, as shown in FIG. 19, the drive force transmission arrangement 65 is constructed as follows. That is, a clutch 66 (or a one-way clutch) is provided to the engine shaft 16 to connect or disconnect the engine 10 relative to the planetary carrier C of the first planetary gear mechanism 13 and the sun gear S of the second planetary gear mechanism 14 through coupling or decoupling, respectively, of the clutch 66 (or the one-way clutch), and the rest of the structure of the drive force transmission arrangement 65 is similar to the drive force transmission arrangement 51 (see FIG. 10) of the second embodiment. In this case, the engine shaft demand MG torque Tem and the output shaft demand MG torque Tpm are computed in a manner similar to that of the seventh embodiment.

Alternatively, the brake or the stationary-end-coupled one-way clutch (e.g., the brake or the stationary-end-coupled one-way clutch of the sixth embodiment) may be provided to the engine shaft 16. In such a case, the engine shaft demand MG torque Tem and the output shaft demand MG torque Tpm are computed in a manner similar to that of the sixth embodiment.

The positional relationship of each of the sun gear S, the ring gear R and the planetary carrier C of each planetary gear mechanism relative to the corresponding shaft (the corresponding one of the engine shaft, the drive force output shaft and the rotatable shaft of the MG) is not limited to the one shown in FIG. 19. That is, the combination of each shaft (each of the engine shaft, the drive force output shaft and the rotatable shaft of the MG) and the corresponding one of the sun gear S, the ring gear R and the planetary carrier C of the corresponding planetary gear mechanism is not limited to the one shown in FIG. 19 and may be modified in any appropriate manner within the principle of the present disclosure.

Ninth Embodiment

Figure 20:
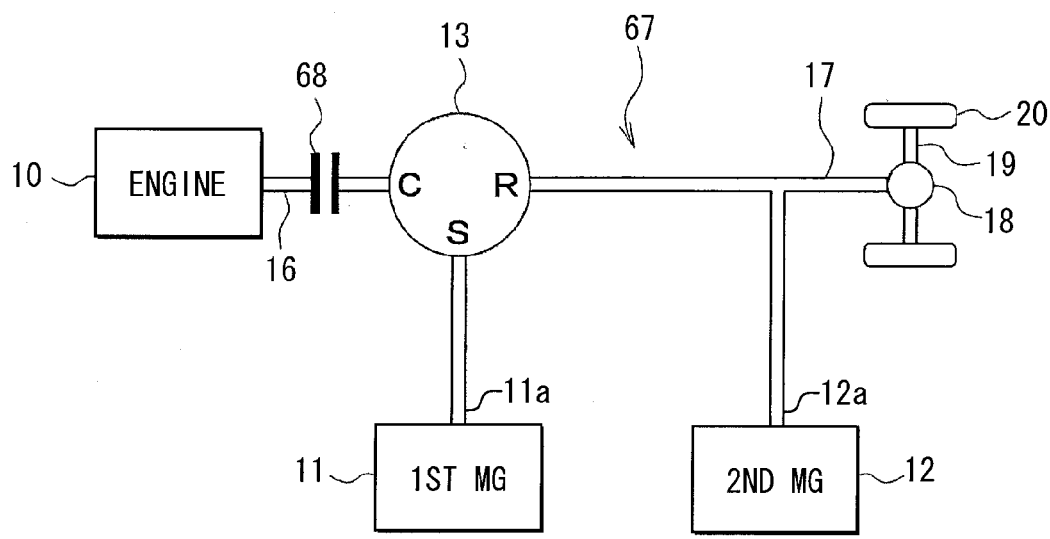
FIG. 20 is a schematic diagram showing a structure of a drive force transmission arrangement and therearound according to a ninth embodiment of the present disclosure.

In a ninth embodiment of the present disclosure, as shown in FIG. 20, the drive force transmission arrangement 67 is constructed as follows. That is, a clutch 68 (or a one-way clutch) is provided to the engine shaft 16 to connect or disconnect the engine 10 relative to the planetary carrier C of the first planetary gear mechanism 13 through coupling or decoupling, respectively, of the clutch 68 (or the one-way clutch), and the rest of the structure of the drive force transmission arrangement 67 is similar to the drive force transmission arrangement 52 (see FIG. 11) of the third embodiment. In this case, the engine shaft demand MG torque Tem and the output shaft demand MG torque Tpm are computed in a manner similar to that of the seventh embodiment.

Alternatively, the brake or the stationary-end-coupled one-way clutch (e.g., the brake or the stationary-end-coupled one-way clutch of the sixth embodiment) may be provided to the engine shaft 16. In such a case, the engine shaft demand MG torque Tem and the output shaft demand MG torque Tpm are computed in a manner similar to that of the sixth embodiment.

The positional relationship of each of the sun gear S, the ring gear R and the planetary carrier C of the planetary gear mechanism relative to the corresponding shaft (the corresponding one of the engine shaft, the drive force output shaft and the rotatable shaft of the MG) is not limited to the one shown in FIG. 20. That is, the combination of each shaft (each of the engine shaft, the drive force output shaft and the rotatable shaft of the MG) and the corresponding one of the sun gear S, the ring gear R and the planetary carrier C of the planetary gear mechanism is not limited to the one shown in FIG. 20 and may be modified in any appropriate manner within the principle of the present disclosure.

Even in the sixth to ninth embodiments discussed above, the hybrid ECU 24 computes the torque command value of the first MG 11 and the torque command value of the second MG 12 through use of the equation of torque equilibrium, which corresponds to the drive force transmission arrangement, based on the engine shaft demand MG torque and the output shaft demand MG torque. Thereby, the three objectives, i.e., the controlling of the rotational speed of the engine, the controlling of the output torque and the limiting of the input and output of the electric power at the battery can be achieved without complicating the control operation of the first and second MGs 11, 12.

In the sixth to ninth embodiments, the present disclosure is applied to the system, which has the clutch device (i.e., the clutch 62, 66, 68, the one-way clutch 64, the brake 56 or the stationary-end-coupled one-way clutch 58) that is provided to the engine shaft 16. However, the present disclosure is not limited to this structure. For instance, the present disclosure may be applied to a system, which has the clutch device (the clutch device similar to the clutch device discussed in any one of the sixth to ninth embodiments) that is provided to the drive force output shaft 17.

In such a case, when the clutch device is switched to the side, at which the transmission of the drive force is not limited (i.e., when the brake or the stationary-end-coupled one-way clutch is in the decoupled state or when the clutch or the one-way clutch is in the coupled state), the output shaft demand MG torque Tpm, which is computed at the output shaft demand MG torque computing unit 45, is directly used. In this way, the output shaft demand MG torque Tpm, which is required to provide the required drive force of the vehicle and to limit the input and output of the electric power at the battery 23, can be accurately set.

In contrast, when it is determined that the brake or the stationary-end-coupled one-way clutch is in the coupled state (the state of preventing the rotation of the drive force output shaft 17), the output shaft demand MG torque Tpm is set to the predetermined value (e.g., zero, the constant other than zero, or the value computed through the use of the equation of torque equilibrium, which is designed for the case where the drive force output shaft 17 serves as the stationary end). Alternatively, when it is determined that the clutch or the one-way clutch is in the decoupled state (the state of disabling the transmission of the drive force), the output shaft demand MG torque Tpm is set to zero (i.e., Tpm=0).

The structure of the drive force transmission arrangement is not limited to any one of the above embodiments and may be modified in an appropriate manner. For instance, a motor generator (MG) of a two-rotor type may be used as a drive-force dividing mechanism.

Furthermore, in each of the above embodiments, the hybrid ECU is used to compute the engine shaft demand MG torque, the output shaft demand MG torque and the torque command values of the MGs. However, the present disclosure is not limited to this. That is, any other appropriate ECU (e.g., the MG ECU), which is other than the hybrid ECU, may be used to compute the engine shaft demand MG torque, the output shaft demand MG torque and the torque command values of the MGs. Further alternatively, both of the hybrid ECU and the other appropriate ECU may be used to compute the engine shaft demand MG torque, the output shaft demand MG torque and the torque command values of the MGs.

Additional advantages and modifications will readily occur to those skilled in the art. The present disclosure in its broader terms is therefore not limited to the specific details, representative apparatus, and illustrative examples shown and described.

What is claimed is:

1. A drive force output apparatus for a vehicle, comprising:
an internal combustion engine;
a plurality of motor generators;
a drive force transmission arrangement that includes at least one drive force dividing mechanism, wherein an engine shaft of the internal combustion engine, rotatable shafts of the plurality of motor generators and a drive force output shaft are interconnected with each other through the drive three transmission arrangement in a manner that enables transmission of a drive force through the drive force transmission arrangement, and the drive force output shaft is connected to a plurality of wheels of the vehicle to transmit a drive force;
a battery that is connected to the plurality of motor generators to output and receive an electric power relative to the plurality of motor generators;

an engine shaft demand motor generator torque computing section that computes an engine shaft demand motor generator torque, which is it torque that is provided from the plurality of motor generators and is required by the engine shaft of the internal combustion engine to control a rotational speed of the internal combustion engine;

an output shaft demand motor generator torque computing section that computes an output shaft demand motor generator torque, which is a torque that is provided from the plurality of motor generators and is required by the drive force output shaft to ensure supply of a required drive force of the vehicle and to limit input and output of the battery; and a motor generator torque command value computing section that computes a torque command value of each of the plurality of motor generators through use of an equation of torque equilibrium, which corresponds to the drive force transmission arrangement, based on the engine shaft demand motor generator torque and the output shaft demand motor generator torque, wherein at least one of the plurality of motor generators outputs the drive force to the drive force output shaft through the drive force transmission arrangement to drive the vehicle with the drive force of the at least one of the plurality of motor generators through the plurality of wheels of the vehicle in a predetermined drive mode.

2. The drive force output apparatus according to claim 1, wherein the engine shaft demand motor generator torque computing section computes the engine shaft demand motor generator torque in a manner that reduces a difference between a target engine rotational speed of the internal combustion engine and an actual engine rotational speed of the internal combustion engine.

3. The drive force output apparatus according to claim 1, further comprising a setting section that sets the engine shaft demand motor generator torque to zero when the vehicle is driven by the drive force provided from the plurality of motor generators in an engine stop state of the internal combustion engine.

4. The drive force output apparatus according to claim 1, further comprising a setting section that sets the engine shaft demand motor generator torque to a value of a required cranking torque, which is required to crank the internal combustion engine, at a time of starting the internal combustion engine.

5. The drive force output apparatus according to claim 1, wherein the output shaft demand motor generator torque computing section computes the output shaft demand motor generator torque based on:

an output shaft demand torque that is a torque, which is required by the drive force output shaft to ensure the required drive force of the vehicle and is computed by the output shaft demand motor generator torque computing section; and an output shaft torque limit amount that is a torque limit amount of the drive force output shaft, which is required to limit input and output of the battery and is computed by the output shaft demand motor generator torque computing section.

6. The drive force output apparatus according to claim 5, wherein:

the output shaft demand motor generator torque computing section computes the outpt shaft demand torque based on:

a target drive output shaft torque that is a target drive torque of the drive force output shaft, which is computed by the output shaft demand motor generator torque computing section based at least on information that indicates a degree of depression of an accelerator pedal; and a mechanical brake torque; which is computed by the output shaft demand motor generator torque computing section based at least on information that indicates a degree of depression eta brake pedal.

7. The drive three output apparatus according to claim 5, wherein:

the output shaft demand motor generator torque computing section computes the output shaft torque limit amount based on:

a battery output estimate value, which is an output estimate value of the battery and is computed by the output shaft demand motor generator torque computing section based on a target battery output, an electric system loss of the drive force output apparatus and a difference between a target engine output and an actual engine output of the internal combustion engine; and a battery output limit value, which is an output limit value of the battery and is computed by the output shaft demand motor generator torque computing section based on a state of the battery.

8. The drive force output apparatus according to claim 1, wherein the at least one drive force dividing mechanism is at least one planetary gear mechanism.

9. The drive force output apparatus according to claim 1, wherein:

at least one of the engine shaft and the drive force output shaft is provided with a clutch device; and the clutch device is one of a clutch, a brake, a one-way clutch and a stationary-end-coupled one-way clutch, wherein the stationary-end-coupled one-way clutch is coupled to a predetermined stationary end.

10. The drive force output apparatus according to claim 9, wherein the engine shaft demand motor generator torque computing section computes the engine shalt demand motor generator torque in a manner that reduces a difference between a target engine rotational speed of the internal combustion engine and an actual engine rotational speed of the internal combustion engine in a state where the clutch device is switched to a side, at which transmission of a drive force through the clutch device is not limited.

11. The drive force output apparatus according to claim 9, wherein in a state where the clutch device is switched to a side, at which transmission of a drive force through the clutch device is not limited, the output shaft demand motor generator torque computing section computes the output shaft demand motor generator torque based on:

an output shaft demand torque that is a torque, which is required by the drive force output shaft to ensure the required drive force of the vehicle and is computed by the output shaft demand motor generator torque computing section; and an output shaft torque limit amount that is a torque limit amount of the drive force output shaft, which is required to limit input and output of the battery and is computed by the output shaft demand motor generator torque computing section.

12. The drive force output apparatus according to claim 9, wherein:

the clutch device is one of the clutch and the one-way clutch;

the drive force output apparatus further comprises a setting section that sets corresponding at least one of the engine shaft demand motor generator torque and the output shaft demand motor generator torque, which corresponds to the at least one of the engine shaft and the drive force output shaft that is provided with the one of the clutch and the one-way clutch; and When the one of the clutch and the one-way clutch is in a decoupled state, the setting section sets the corresponding at least one of the engine shaft demand motor generator torque and the output shaft demand motor generator torque to zero.

13. The drive force output apparatus according to claim 9, wherein:
the clutch device is one of the brake and the stationary-end-coupled one-way clutch;
the drive force output apparatus further comprises a setting section that sets corresponding at least one of the engine shaft demand motor generator torque and the output shaft demand motor generator torque, which corresponds to the at least one of the engine shaft and the drive force Output shaft that is provided with the one of the brake and the stationary-end-coupled one-way clutch; and when the one of the brake and the stationary-end-coupled one-way clutch is in a coupled state, the setting; section sets the corresponding at least one of the engine shaft demand motor generator torque and the output shaft demand motor generator torque to a predetermined torque.

14. The drive force output apparatus according to claim 13, wherein a value of the predetermined torque is zero.

15. The drive force output apparatus according to claim 13, wherein a value of the predetermined torque is a constant, which is other than zero.

16. The drive force output apparatus according to claim 13, wherein a value of the predetermined torque is a corresponding value that is computed through use of an equation of torque equilibrium, which corresponds to a case where the at least one of the engine shaft and the drive force output shaft, which is provided with the one of the brake and the stationary-end-coupled one-way clutch, serves as a stationary end.

* * * * *